US008892231B2

(12) United States Patent
Cheng et al.

(10) Patent No.: US 8,892,231 B2
(45) Date of Patent: Nov. 18, 2014

(54) AUDIO CLASSIFICATION METHOD AND SYSTEM

(75) Inventors: Bin Cheng, Beijing (CN); Lie Lu, Beijing (CN)

(73) Assignee: Dolby Laboratories Licensing Corporation, San Francisco, CA (US)

(*) Notice: Subject to any disclaimer, the term of this patent is extended or adjusted under 35 U.S.C. 154(b) by 306 days.

(21) Appl. No.: 13/591,466

(22) Filed: Aug. 22, 2012

(65) Prior Publication Data

US 2013/0058488 A1 Mar. 7, 2013

Related U.S. Application Data

(60) Provisional application No. 61/549,411, filed on Oct. 20, 2011.

(30) Foreign Application Priority Data

Sep. 2, 2011 (CN) .......................... 2011 1 0269279

(51) Int. Cl.

*G06F 17/00* (2006.01)
*G10L 21/00* (2013.01)
*G10L 25/81* (2013.01)
*G10L 25/51* (2013.01)
*G10L 19/20* (2013.01)

(52) U.S. Cl.

CPC ................. *G10L 25/81* (2013.01); *G10L 25/51* (2013.01); *G10L 19/20* (2013.01)
USPC .............................. 700/94; 704/211; 704/213

(58) Field of Classification Search

CPC ......... G10L 19/18; G10L 19/20; G10L 19/22; G10L 19/24; G10L 25/81; G10H 2210/046
USPC ........... 381/56, 98, 61; 700/94; 704/211, 213, 704/216, 217, 219, 233, 236, E15.004, 704/E15.048, E11.003; 84/603, 604, 607; 707/999.001, E17.009
See application file for complete search history.

(56) References Cited

U.S. PATENT DOCUMENTS 4,542,525 A * 9/1985 Hopf ............................... 381/56
5,712,953 A 1/1998 Langs (Continued)

FOREIGN PATENT DOCUMENTS

CN 101751920 6/2010
EP 0738999 10/1996

(Continued)

OTHER PUBLICATIONS

Aarts R M et al. "A Real-Time Speech-Music Discriminator" Journal of the Audio Engineering Society, Audio Engineering Society, New York, NY, vol. 47, No. 9, Sep. 1, 1999, pp. 720-725.

(Continued)

*Primary Examiner* — Vivian Chin
*Assistant Examiner* — Jason R Kurr

(57) ABSTRACT

Embodiments for audio classification are described. An audio classification system includes at least one device which executes a process of audio classification on an audio signal. The at least one device can operate in at least two modes requiring different resources. The audio classification system also includes a complexity controller which determines a combination and instructs the at least one device to operate according to the combination. For each of the at least one device, the combination specifies one of the modes of the device, and the resources requirement of the combination does not exceed maximum available resources. By controlling the modes, the audio classification system has improved scalability to an execution environment.

20 Claims, 14 Drawing Sheets

(56) References Cited

U.S. PATENT DOCUMENTS

| | | | | |
|---|---|---|---|---|
| 6,088,732 | A * | 7/2000 | Smith et al. | 709/229 |
| 6,466,923 | B1 | 10/2002 | Young | |
| 6,785,645 | B2 * | 8/2004 | Khalil et al. | 704/216 |
| 6,934,694 | B2 | 8/2005 | Jamieson | |
| 7,072,493 | B2 | 7/2006 | Venkatesan | |
| 7,080,008 | B2 | 7/2006 | Jiang | |
| 7,082,394 | B2 | 7/2006 | Burges | |
| 7,095,873 | B2 | 8/2006 | Venkatesan | |
| 7,136,535 | B2 | 11/2006 | Venkatesan | |
| 7,152,163 | B2 | 12/2006 | Mihcak | |
| 7,181,622 | B2 | 2/2007 | Mihcak | |
| 7,188,249 | B2 | 3/2007 | Mihcak | |
| 7,240,210 | B2 | 7/2007 | Mihcak | |
| 7,245,767 | B2 | 7/2007 | Moreno | |
| 7,266,244 | B2 | 9/2007 | Mihcak | |
| 7,318,157 | B2 | 1/2008 | Mihcak | |
| 7,318,158 | B2 | 1/2008 | Mihcak | |
| 7,328,153 | B2 | 2/2008 | Wells | |
| 7,356,188 | B2 | 4/2008 | Venkatesan | |
| 7,373,209 | B2 * | 5/2008 | Tagawa et al. | 700/94 |
| 7,406,195 | B2 | 7/2008 | Mihcak | |
| 7,421,128 | B2 | 9/2008 | Venkatesan | |
| 7,568,103 | B2 | 7/2009 | Mihcak | |
| 7,599,554 | B2 | 10/2009 | Agnihotri | |
| 7,617,398 | B2 | 11/2009 | Mihcak | |
| 7,634,660 | B2 | 12/2009 | Mihcak | |
| 7,636,849 | B2 | 12/2009 | Mihcak | |
| 7,657,752 | B2 | 2/2010 | Mihcak | |
| 7,707,425 | B2 | 4/2010 | Mihcak | |
| 7,738,778 | B2 | 6/2010 | Agnihotri | |
| 7,770,014 | B2 | 8/2010 | Venkatesan | |
| 7,831,832 | B2 | 11/2010 | Kozat | |
| 7,877,438 | B2 | 1/2011 | Schrempp | |
| 2003/0023428 | A1 | 1/2003 | Chang | |
| 2003/0229629 | A1 | 12/2003 | Jasinschi | |
| 2008/0162121 | A1 * | 7/2008 | Son et al. | 704/201 |
| 2009/0254352 | A1 | 10/2009 | Zhao | |
| 2010/0004926 | A1 | 1/2010 | Neoran | |
| 2010/0026784 | A1 | 2/2010 | Burazerovic | |
| 2013/0070928 | A1 * | 3/2013 | Ellis et al. | 381/56 |

FOREIGN PATENT DOCUMENTS

| | | |
|---|---|---|
| EP | 2328363 | 6/2011 |
| JP | 59-203202 | 11/1984 |
| JP | 2005-311633 | 11/2005 |
| WO | 2008019122 | 2/2008 |

OTHER PUBLICATIONS

Scheirer E et al. "Construction and Evaluation of a Robust Multifeature Speech/Music Discriminator" IEEE International Conference on Acoustics, Speech, and Signal Processing, 1997, vol. 2, Apr. 21, 1997, pp. 1331-1334.
El-Maleh K et al. "Speech/Music Discrimination for Multimedia Applications" Acoustics, Speech, and Signal Processing, 2000, ICASSP Proc. Jun. 5-9, 2000, vol. 6, pp. 2445-2448.
Garcia Galan Sebastian et al. "Design and Implementation of a Web-Based Software Framework for Real Time Intelligent Audio Coding Based on Speech/Music Discrimination" AES Convention 122, May 2007, New York, USA.
Lu, L. et al. "Content Analysis for Audio Classification and Segmentation", IEEE Transactions on Speech and Audio Processing, vol. 10, No. 7, Oct. 2002.
Guo, G. et al. "Content-Based Audio Classification and Retrieval by Support Vector Machines" IEEE Transactions on Neural Networks, vol. 14, No. 1, Jan. 2003.
McKinney, M.F. et al., "Features for Audio and Music Classification" Proceedings of ISMIR (International Symposium of Music Information Retrieval) 2003, Baltimore, USA, Oct. 2003.
Lu, L. et al. "Content-based Audio Classification and Segmentation by Using Support Vector Machines", Multimedia Systems (8), 482-292, 2003.
Zhang, T. "Audio Content Analysis for Online Audiovisual Data Segmentation and Classification", IEEE Transaction on Speech and Audio Processing, vol. 9, No. 4, May 2001.
Quatieri, T. et al. "Speech Transformations Based on a Sinusoidal Representation", IEEE Transactions on Acoustics, Speech and Signal Processing, vol. 34, No. 6, Dec. 1986.
Freund, Y. et al. "A Short Introduction to Boosting", Journal of Japanese Society for Artificial Intelligence 14(5): 771-780, 1999.
Lu, L. et al. "Repeating Pattern Discovery and Structure Analysis from Acoustic Music Data" Proc. the 6th ACM SIGMM International Workshop on Multimedia Information Retrieval, 2004.
Lu, L. et al. "A Robust Audio Classification and Segmentation Method", Proceedings of the 9th ACM International Conference on Multimedia, Ottawa, Canada, 2001.

* cited by examiner

AUDIO CLASSIFICATION METHOD AND SYSTEM

CROSS REFERENCE TO RELATED APPLICATIONS

This application claims the benefit of priority to related, co-pending Chinese Patent Application number 201110269279.X filed on 2 Sep. 2011 and U.S. Patent Application No. 61/549,411 filed on 20 Oct. 2011 entitled "Audio Classification Method and System" by Cheng, Bin et al. hereby incorporated by reference in its entirety.

TECHNICAL FIELD

The present invention relates generally to audio signal processing. More specifically, embodiments of the present invention relate to audio classification methods and systems.

BACKGROUND

In many applications, there is a need to identify and classify audio signals. One such classification is automatically classifying an audio signal into speech, music or silence. In general, audio classification involves extracting audio features from an audio signal and classifying with a trained classifier based on the audio features.

Methods of audio classification have been proposed to automatically estimate the type of input audio signals so that manual labeling of audio signals can be avoided. This can be used for efficient categorization and browsing for large amount of multimedia data. Audio classification is also widely used to support other audio signal processing components. For example, a speech-to-noise audio classifier is of great benefits for a noise suppression system used in a voice communication system. As another example, in a wireless communications system apparatus, through audio classification, audio signal processing can implement different encoding and decoding algorithms to the signal depending on whether or not the signal is speech, music or silence.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY

According to an embodiment of the invention, an audio classification system is provided. The system includes at least one device operable in at least two modes requiring different resources. The system also includes a complexity controller which determines a combination and instructs the at least one device to operate according to the combination. For each of the at least one device, the combination specifies one of the modes of the device, and the resources requirement of the combination does not exceed maximum available resources. The at least one device may comprise at least one of a preprocessor for adapting the audio signal to the audio classification system, a feature extractor for extracting audio features from segments of the audio signal, a classification device for classifying the segments with a trained model based on the extracted audio features, and a post processor for smoothing the audio types of the segments.

According to an embodiment of the invention, an audio classification method is provided. The method includes at least one step which can be executed in at least two modes requiring different resources. A combination is determined. The at least one step is instructed to execute according to the combination. For each of the at least one step, the combination specifies one of the modes of the step, and the resources requirement of the combination does not exceed maximum available resources. The at least one step comprises at least one of a pre-processing step of adapting the audio signal to the audio classification; a feature extracting step of extracting audio features from segments of the audio signal; a classifying step of classifying the segments with a trained model based on the extracted audio features; and a post processing step of smoothing the audio types of the segments.

According to an embodiment of the invention, an audio classification system is provided. The system includes a feature extractor for extracting audio features from segments of the audio signal. The feature extractor includes a coefficient calculator and a statistics calculator. The coefficient calculator calculates long-term auto-correlation coefficients of the segments longer than a threshold in the audio signal based on the Wiener-Khinchin theorem, as the audio features. The statistics calculator calculates at least one item of statistics on the long-term auto-correlation coefficients for the audio classification, as the audio features. The system also includes a classification device for classifying the segments with a trained model based on the extracted audio features.

According to an embodiment of the invention, an audio classification method is provided. Audio features are extracted from segments of the audio signal. The segments are classified with a trained model based on the extracted audio features. To extract the audio features, long-term auto-correlation coefficients of the segments longer than a threshold in the audio signal are calculated based on the Wiener-Khinchin theorem, as the audio features. At least one item of statistics on the long-term auto-correlation coefficients for the audio classification is calculated as the audio features.

According to an embodiment of the invention, an audio classification system is provided. The system includes a feature extractor for extracting audio features from segments of the audio signal, and a classification device for classifying the segments with a trained model based on the extracted audio features. The feature extractor includes a low-pass filter for filtering the segments, where low-frequency percussive components are permitted to pass. The feature extractor also includes a calculator for extracting bass indicator feature by applying zero crossing rate (ZCR) on each of the segments, as the audio feature.

According to an embodiment of the invention, an audio classification method is provided. Audio features are extracted from segments of the audio signal. The segments are classified with a trained model based on the extracted audio features. To extract the audio features, the segments are filtered through a low-pass filter where low-frequency percussive components are permitted to pass. A bass indicator feature is extracted by applying zero crossing rate (ZCR) on each of the segments, as the audio feature.

According to an embodiment of the invention, an audio classification system is provided. The system includes a feature extractor for extracting audio features from segments of the audio signal, and a classification device for classifying the segments with a trained model based on the extracted audio features. The feature extractor includes a residual calculator and a statistics calculator. For each of the segments, the residual calculator calculates residuals of frequency decomposition of at least level 1, level 2 and level 3 respectively by removing at least a first energy, a second energy and a third energy respectively from total energy E on a spectrum of each of frames in the segment. For each of the segments, the statistics calculator calculates at least one item of statistics on the residuals of the same level for the frames in the segment. The calculated residuals and statistics are included in the audio features.

According to an embodiment of the invention, an audio classification method is provided. Audio features are extracted from segments of the audio signal. The segments are classified with a trained model based on the extracted audio features. To extracting the audio features, for each of the segments, residuals of frequency decomposition of at least level 1, level 2 and level 3 are calculated respectively by removing at least a first energy, a second energy and a third energy respectively from total energy E on a spectrum of each of frames in the segment. For each of the segments, at least one item of statistics on the residuals of the same level for the frames in the segment is calculated. The calculated residuals and statistics are included in the audio features.

According to an embodiment of the invention, an audio classification system is provided. The system includes a feature extractor for extracting audio features from segments of the audio signal, and a classification device for classifying the segments with a trained model based on the extracted audio features. The feature extractor includes a ratio calculator which calculates a spectrum-bin high energy ratio for each of the segments as the audio feature. The spectrum-bin high energy ratio is the ratio between the number of frequency bins with energy higher than a threshold and the total number of frequency bins in the spectrum of the segment.

According to an embodiment of the invention, an audio classification method is provided. Audio features are extracted from segments of the audio signal. The segments are classified with a trained model based on the extracted audio features. To extract the audio features, a spectrum-bin high energy ratio is calculated for each of the segments as the audio feature. The spectrum-bin high energy ratio is the ratio between the number of frequency bins with energy higher than a threshold and the total number of frequency bins in the spectrum of the segment.

According to an embodiment of the invention, an audio classification system is provided. The system includes a feature extractor for extracting audio features from segments of the audio signal; and a classification device for classifying the segments with a trained model based on the extracted audio features. The classification device includes a chain of at least two classifier stages with different priority levels, which are arranged in descending order of the priority levels. Each classifier stage includes a classifier which generates current class estimation based on the corresponding audio features extracted from each of the segments. The current class estimation includes an estimated audio type and corresponding confidence. Each classifier stage also includes a decision unit. If the classifier stage is located at the start of the chain, the decision unit determines whether the current confidence is higher than a confidence threshold associated with the classifier stage. If it is determined that the current confidence is higher than the confidence threshold, the decision unit terminates the audio classification by outputting the current class estimation. If otherwise, the decision unit provides the current class estimation to all the later classifier stages in the chain. If the classifier stage is located in the middle of the chain, the decision unit determines whether the current confidence is higher than the confidence threshold, or whether the current class estimation and all the earlier class estimation can decide an audio type according to a first decision criterion. If it is determined that the current confidence is higher than the confidence threshold, or the class estimation can decide an audio type, the decision unit terminates the audio classification by outputting the current class estimation, or outputting the decided audio type and the corresponding confidence. Otherwise, the decision unit provides the current class estimation to all the later classifier stages in the chain. If the classifier stage is located at the end of the chain, the decision unit terminates the audio classification by outputting the current class estimation. Or the decision unit determines whether the current class estimation and all the earlier class estimation can decide an audio type according to a second decision criterion. If it is determined that the class estimation can decide an audio type, the decision unit terminates the audio classification by outputting the decided audio type and the corresponding confidence. If otherwise, the decision unit terminates the audio classification by outputting the current class estimation.

According to an embodiment of the invention, an audio classification method is provided. Audio features are extracted from segments of the audio signal. The segments are classified with a trained model based on the extracted audio features. The classifying includes a chain of at least two sub-steps with different priority levels, which are arranged in descending order of the priority levels. Each sub-step involves generating current class estimation based on the corresponding audio features extracted from each of the segments. The current class estimation includes an estimated audio type and corresponding confidence. If the sub-step is located at the start of the chain, the sub-step involves determining whether the current confidence is higher than a confidence threshold associated with the sub-step. If it is determined that the current confidence is higher than the confidence threshold, the sub-step involves terminating the audio classification by outputting the current class estimation. If otherwise, the sub-step involves providing the current class estimation to all the later sub-steps in the chain. If the sub-step is located in the middle of the chain, the sub-step involves determining whether the current confidence is higher than the confidence threshold, or whether the current class estimation and all the earlier class estimation can decide an audio type according to a first decision criterion. If it is determined that the current confidence is higher than the confidence threshold, or the class estimation can decide an audio type, the sub-step involves terminating the audio classification by outputting the current class estimation, or outputting the decided audio type and the corresponding confidence. If otherwise, the sub-step involves providing the current class estimation to all the later sub-steps in the chain. If the sub-step is located at the end of the chain, the sub-step involves terminating the audio classification by outputting the current class estimation. Or the sub-step involves determining whether the current class estimation and all the earlier class estimation can decide an audio type according to a second decision criterion. If it is determined that the class estimation can decide an audio type, the sub-step involves terminating the audio classification by outputting the decided audio type and the corresponding confidence. If otherwise, the sub-step involves terminating the audio classification by outputting the current class estimation.

According to an embodiment of the invention, an audio classification system is provided. The system includes a feature extractor for extracting audio features from segments of the audio signal, a classification device for classifying the segments with a trained model based on the extracted audio features, and a post processor for smoothing the audio types of the segments. The post processor includes a detector which searches for two repetitive sections in the audio signal, and a smoother which smoothes the classification result by regarding the segments between the two repetitive sections as non-speech type.

According to an embodiment of the invention, an audio classification method is provided. Audio features are extracted from segments of the audio signal. The segments are classified with a trained model based on the extracted audio features. The audio types of the segments are smoothed by searching for two repetitive sections in the audio signal, and smoothing the classification result by regarding the segments between the two repetitive sections as non-speech type.

According to an embodiment of the invention, a computer-readable medium having computer program instructions recorded thereon is provided. When being executed by a processor, the instructions enable the processor to execute an audio classification method. The method includes at least one step which can be executed in at least two modes requiring different resources. A combination is determined. The at least one step is instructed to execute according to the combination. For each of the at least one step, the combination specifies one of the modes of the step, and the resources requirement of the combination does not exceed maximum available resources. The at least one step includes at least one of a pre-processing step of adapting the audio signal to the audio classification, a feature extracting step of extracting audio features from segments of the audio signal, a classifying step of classifying the segments with a trained model based on the extracted audio features, and a post processing step of smoothing the audio types of the segments.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION

Figure 1:
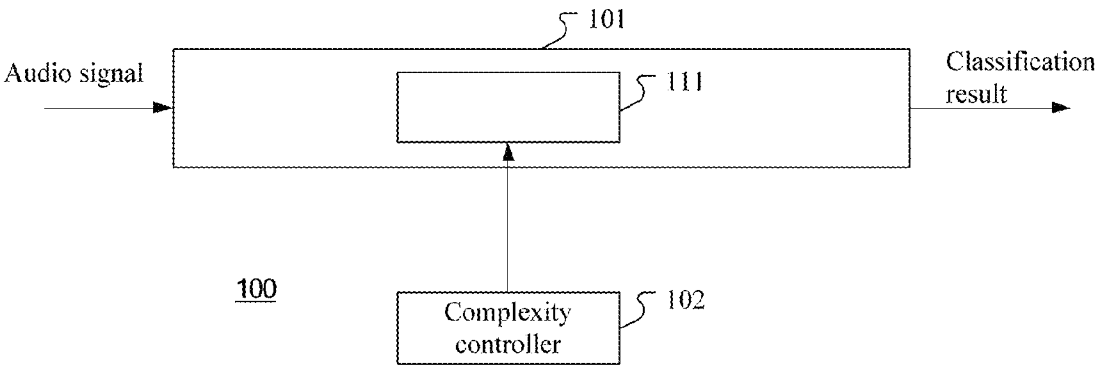
FIG. 1 is a block diagram illustrating an example audio classification system according to an embodiment of the invention.

The embodiments of the present invention are below described by referring to the drawings. It is to be noted that, for purpose of clarity, representations and descriptions about those components and processes known by those skilled in the art but not necessary to understand the present invention are omitted in the drawings and the description.

As will be appreciated by one skilled in the art, aspects of the present invention may be embodied as a system (e.g., an online digital media store, cloud computing service, streaming media service, telecommunication network, or the like), device (e.g., a cellular telephone, portable media player, personal computer, television set-top box, or digital video recorder, or any media player), method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Complexity Control

FIG. 1 is a block diagram illustrating an example audio classification system 100 according to an embodiment of the invention.

As illustrated in FIG. 1, audio classification system 100 includes a complexity controller 102. To perform the audio classification on an audio signal, a number of processes such as feature extracting and classifying are involved. Accordingly, audio classification system 100 may include corresponding devices for performing these processes (collectively represented by reference number 101). Some of the devices (each called a multi-mode device) may execute the corresponding processes in different modes requiring different resources. One of such multi-mode devices, device 111, is illustrated in FIG. 1.

Executing a process can consume resources such as a memory, an I/O, an electrical power, and a central processing unit (CPU), etc. Different algorithms and configurations for performing the same function of the process but requiring different resources provide possibility that the device operates by adopting one of combinations (e.g., modes) of these different algorithms and configurations. Each mode may determine specific resources requirement (consumption) of the device. For example, a classifying process may input audio features into a classifier to obtain a classification result. To perform this function, a classifier processing more audio features for audio classification may consume more resources than another classifier processing less audio features, if two classifiers are based on the same classification algorithm. This is an example of different configurations. Also, to perform this function, a classifier based on a combination of multiple classification algorithms may consume more resources than another classifier based on only one of the algorithms, if two classifiers process the same audio features. This is an example of different algorithms. In this way, some of the multi-mode devices (e.g., device 111) may be configured to be able to operate in different modes requiring different resources. Any of the multi-mode devices may have more than two modes, depending on available optional algorithms and configurations for performing the device's function.

In performing the audio classification, each of the multi-mode devices may operate in one of its modes. This mode is called as an active mode. Complexity controller 102 may determine a combination of active modes of the multi-mode devices, and instructs the multi-mode devices to operate according to the combination, that is, in the corresponding active mode defined in the combination. There may be various possible combinations. Complexity controller 102 may select one of them of which the resources requirement does not exceed maximum available resources. The maximum available resources may be fixed, or estimated by collecting information on available resources for audio classification system 100, or set by a user. The maximum available resources may be determined at time of mounting audio classification system 100 or starting audio classification system 100, or at a regular time interval, or at time of starting an audio classification task, or in response to an external command, or even at random.

In an example, it is possible to establish a profile for each of the multi-mode devices. The profile includes entries representing the corresponding modes. Each entry may at least include a mode identification for identifying the corresponding mode and information on estimated resources requirement in the mode. Complexity controller 102 may calculate total resources requirement based on the estimated resources requirement in the entries corresponding to the active modes defined in each of the possible combinations, and select one combination with the total resources requirement below the maximum resources requirement.

Depending on specific implementations, the multi-mode devices may include at least one of a preprocessor, a feature extractor, a classification device and a post processor.

The pre-processor may adapt the audio signal to audio classification system 100. The sampling rate and quantization precision of the audio signal may be different from that required by audio classification system 100. In this case, the pre-processor may adjust the sampling rate and quantization precision of the audio signal to comply with the requirement of audio classification system 100. Additionally or alternatively, the pre-processor may pre-emphasize the audio signal to enhance a specific frequency range (e.g., high frequency range) of the audio signal. In audio classification system 100, the pre-processor may be optional, even if it is not of multi-mode.

To identify the audio type of a segment of the audio signal, the feature extractor may extract audio features from the segment. There may be one or more active classifiers in the classification device. Each classifier needs a number of audio features for performing its classification operation on the segment. The feature extractor extracts the audio features according to requirement of the classifiers. Depending on the requirement of the classifiers, some audio features may be extracted directly from the segment, while some audio features may be audio features extracted from frames (each called as a frame-level feature) in the segment or derivatives of the frame-level features (each called as a window-level feature).

Based on the audio features extracted from the segment, the classification device classifies (that is, identifies the audio type of) the segment with a trained model. One or more active classifiers are organized with a decision making scheme in the trained model.

By performing the audio classification on the segments of the audio signal, a sequence of the audio types can be generated. The post processor may smooth the audio types of the sequence. By smoothing, un-realistic sudden changes of audio type in the sequence may be removed. For example, a single audio type of "speech" among a large number of continuous "music" is likely to be a wrong estimation, and can be smoothed (removed) by the post processor. In audio classification system 100, the post processor may be optional, even if it is not of multi-mode.

Because the resources requirement of audio classification system 100 can be adjusted by choosing an appropriate combination of active modes, audio classification system 100 may be adapted to the execution environment changing over time, or migrated from one platform to another platform (e.g., from a personal computer to a portable terminal) without significant modification, thus increasing at least one of the availability, the scalability and the portability.

Figure 2:
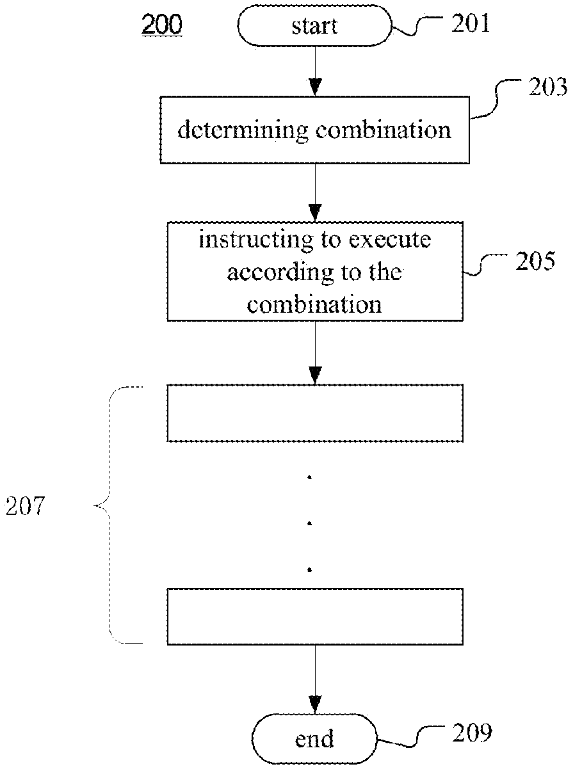
FIG. 2 is a flow chart illustrating an example audio classification method according to an embodiment of the present invention.

FIG. 2 is a flow chart illustrating an example audio classification method 200 according to an embodiment of the present invention.

To perform the audio classification on an audio signal, a number of processes such as feature extracting and classifying are involved. Accordingly, audio classification method 200 may include corresponding steps of performing these processes (collectively represented by reference number 207). Some of the steps (each called as a multi-mode step) may execute the corresponding processes in different modes requiring different resources.

As illustrated in FIG. 2, audio classification method 200 starts from step 201. At step 203, a combination of active modes of the multi-mode steps is determined.

At step 205, the multi-mode steps is instructed to operate according to the combination, that is, in the corresponding active mode defined in the combination.

At steps 207, the corresponding processes are executed to perform the audio classification, where the multi-mode steps are executed in the active modes defined in the combination.

At step 209, audio classification method 200 ends.

Depending on specific implementations, the multi-mode steps may include at least one of a pre-processing step of adapting the audio signal to the audio classification; a feature extracting step of extracting audio features from segments of the audio signal; a classifying step of classifying the segments with a trained model based on the extracted audio features; and a post processing step of smoothing the audio types of the segments. The pre-processing step and the post processing step may be optional, even if they are not of multi-mode.

Pre-Processing

In further embodiments of audio classification system 100 and audio classification method 200, the multi-mode devices and steps include the pre-processor and the pre-processing step respectively. The modes of the pre-processor and the modes of the pre-processing step include one mode $MP_1$ and another mode $MP_2$. In the mode $MP_1$, the sampling rate of the audio signal is converted with filtering (requiring more resources). In the mode $MP_2$, the sampling rate of the audio signal is converted without filtering (requiring less resources).

Among the audio features extracted for the audio classification, a first type of the audio features are not suitable to pre-emphasis, that is to say, can reduce the classification performance if the audio signal is pre-emphasized, and a second type of the audio features are suitable to pre-emphasis, that is to say, can improve the classification performance if the audio signal is pre-emphasized.

As an example of pre-emphasizing, a time-domain pre-emphasis may be applied to the audio signal before the process of feature extracting. This pre-emphasis can be expressed as:

$$s'(n)=s(n)-\beta\cdot s(n-1) \quad (1)$$

where n is the temporal index, s(n) and s'(n) are audio signals before and after the pre-emphasis respectively, and β is the pre-emphasis factor usually set to a value close to 1, e.g. 0.98.

Figure 3:
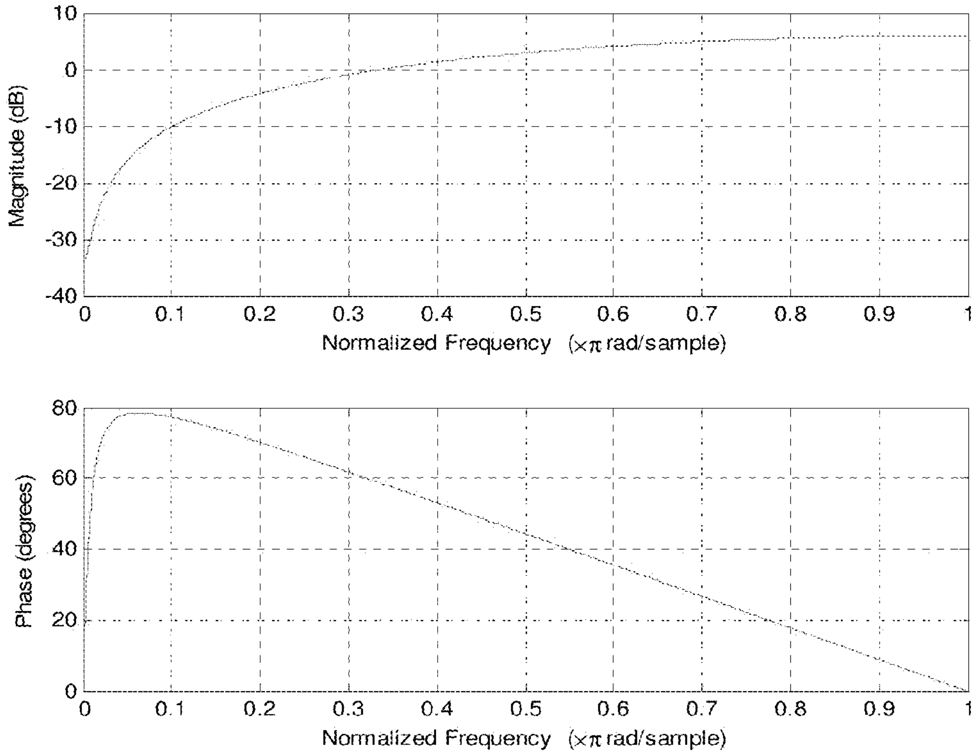
FIG. 3 is a graph for illustrating the frequency response of an example high-pass filter which is equivalent to the time-domain pre-emphasis expressed by Eq. (1) with $\beta=0.98$.

Additionally or alternatively, the modes of the pre-processor and the modes of the pre-processing step include one mode $MP_3$ and another mode $MP_4$. In the mode $MP_3$, the audio signal S(t) is directly pre-emphasized, and the audio signal S(t) and the pre-emphasized audio signal S'(t) are transformed into frequency domain, so as to obtain a transformed audio signal S(ω) and a pre-emphasized transformed audio signal S'(ω). In the mode $MP_4$, the audio signal S(t) is transformed into frequency domain, so as to obtain a transformed audio signal S(ω), and the transformed audio signal S(ω) is pre-emphasized, for example by using a high-pass filter having the same frequency response as that derived from Eq. (1), so as to obtain a pre-emphasized transformed audio signal S'(ω). FIG. 3 is a graph for illustrating the frequency response of an example high-pass filter which is equivalent to the time-domain pre-emphasis expressed by Eq. (1) with β=0.98.

In this case, in the process of extracting the audio features, the audio features of the first type are extracted from the transformed audio signal S(ω) not being pre-emphasized, and the audio features of the second type are extracted from the transformed audio signal S'(ω) being pre-emphasized. In mode $MP_4$, because one transform is omitted, less resource is required.

In case that the pre-processor and the pre-processing step have the functions of adapting and pre-emphasizing, the modes $MP_1$ to $MP_4$ may be independent modes. Additionally, there may be combined modes of the modes $MP_1$ and $MP_3$, the modes $MP_1$ and $MP_4$, the modes $MP_2$ and $MP_3$, and the modes $MP_2$ and $MP_4$. In this case, the modes of the pre-processor and the modes of the pre-processing step may include at least two of the modes $MP_1$ to $MP_4$ and the combined modes.

In an example, the first type may include at least one of sub-band energy distribution, residual of frequency decomposition, zero crossing rate (ZCR), spectrum-bin high energy ratio, bass indicator and long-term auto-correlation feature, and the second type may include at least one of spectrum fluctuation (spectrum flux) and mel-frequency cepstral coefficients (MFCC).

Feature Extracting

Long-Term Auto-Correlation Coefficients

In a further embodiment of audio classification system 100, the multi-mode devices include the feature extractor. The feature extractor may calculate long-term auto-correlation coefficients of the segments longer than a threshold in the audio signal based on the Wiener-Khinchin theorem. The feature extractor may also calculate at least one item of statistics on the long-term auto-correlation coefficients for the audio classification.

In a further embodiment of audio classification method 200, the multi-mode steps include the feature extracting step. The feature extracting step may include calculating long-term auto-correlation coefficients of the segments longer than a threshold in the audio signal based on the Wiener-Khinchin theorem. The feature extracting step may also include calculating at least one item of statistics on the long-term auto-correlation coefficients for the audio classification.

Figure 4A:
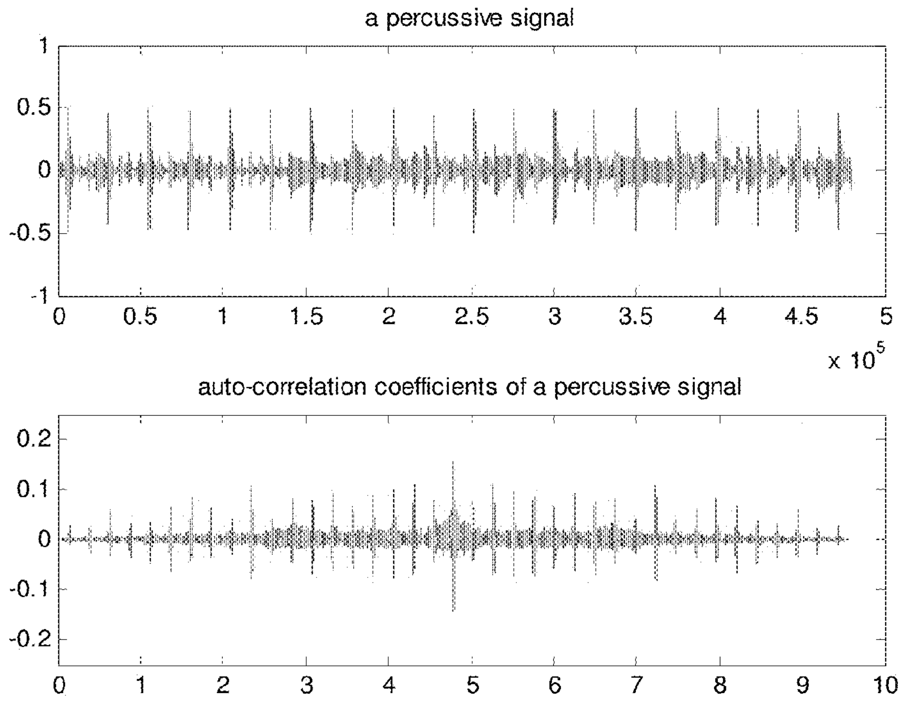
FIG. 4A is a graph for illustrating a percussive signal and its auto-correlation coefficients.
Figure 4B:
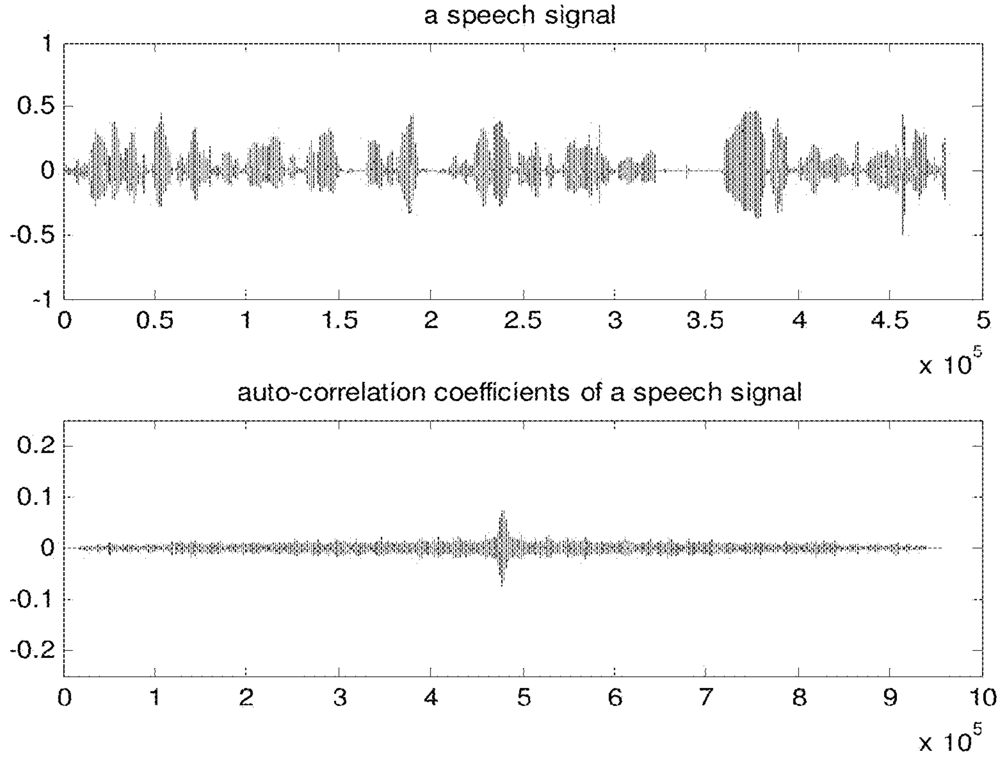
FIG. 4B is a graph for illustrating a speech signal and its auto-correlation coefficients.

Some percussive sounds, especially those with relatively constant tempo, have a unique property that they are highly periodic, in particular when observed between percussive onsets or measures. This property can be exploited by long-term auto-correlation coefficients of a segment with relatively longer length, e.g. 2 seconds. According to the definition, long-term auto-correlation coefficients may exhibit significant peaks on the delay-points following the percussive onsets or measures. This property cannot be found in speech signals, as they hardly repeat themselves. As illustrated in FIG. 4A, periodic peaks can be found in the long-term auto-correlation coefficients of a percussive signal, in comparison with the long-term auto-correlation coefficients of a speech signal illustrated in FIG. 4B. The threshold may be set to ensure that this property difference can be exhibited in the long-term auto-correlation coefficients. The statistics is calculated to capture the characteristics in the long-term auto-correlation coefficients which can distinguish the percussive signal from the speech signal.

In this case, the modes of the feature extractor may include one mode $MF_1$ and another mode $MF_2$. In the mode $MF_1$, the long-term auto-correlation coefficients are directly calculated from the segments. In the mode $MF_2$, the segments are decimated and the long-term auto-correlation coefficients are calculated from the decimated segments. Because of the decimation, the calculation cost can be reduced, thus reducing the resources requirement.

In an example, the segments have a number N of samples s(n), n=1, 2, . . . , N. In the mode $MF_1$, the long-term auto-correlation coefficients are calculated based on the Wiener-Khinchin theorem.

According to the Wiener-Khinchin theorem, the frequency coefficients are derived by a 2N-point fast-Fourier Transform (FFT):

$$S(k)=\mathrm{FFT}(s(n),2N) \tag{2}$$

where FFT(x,2N) denotes 2N-point FFT analysis of signal x, and the long-term auto-correlation coefficients are subsequently derived as:

$$A(\tau)=\mathrm{IFFT}(S(k)\cdot S^*(k)) \tag{3}$$

where A(τ) is the series of long-term auto-correlation coefficients, S*(k) denotes complex conjugations of S(k) and IFFT( ) represents the inverse FFT.

In the mode $MF_2$, the segments s(n) is decimated (e.g. by a factor of D, where D>10) before calculating the long-term auto-correlation coefficients, while other calculations remain the same as in the mode $MF_1$.

For example, if one segment has 32000 samples, which should be zero-padded to 2×32768 samples for efficient FFT, the process in the mode $MF_1$ requires approximately $1.7\times10^6$ multiplications comprised of:

1) 2×2×32768×log(2×32768) multiplications used for FFT and IFFT; and
2) 4×2×32768 multiplications used for multiplication between frequency coefficients and conjugated coefficients.

If the segments are decimated by a factor of 16 to 2048 samples, the complexity is significantly reduced to approximately $8.4\times10^4$ multiplications. In this case, the complexity is reduced to approximately 5% of the original.

In an example, the statistics may include at least one of the following items:

1) mean: an average of all the long-term auto-correlation coefficients;

2) variance: a standard deviation value of all the long-term auto-correlation coefficients;

3) High_Average: an average of the long-term auto-correlation coefficients that satisfy at least one of the following conditions:

a) greater than a threshold; and
b) within a predetermined proportion of long-term auto-correlation coefficients not lower than all the other long-term auto-correlation coefficients. For example, if all the long-term auto-correlation coefficients are represented as $c_1$, $c_2$, . . . , $c_n$ arranged in descending order, the predetermined proportion of long-term auto-correlation coefficients include $c_1, c_2, \ldots, c_m$ where m/n equals to the predetermined proportion;

4) High_Value_Percentage: a ratio between the number of the long-term auto-correlation coefficients involved in the High_Average and the total number of long-term auto-correlation coefficients;

5) Low_Average: an average of the long-term auto-correlation coefficients that satisfy at least one of the following conditions:

c) smaller than a threshold; and d) within a predetermined proportion of long-term auto-correlation coefficients not higher than all the other long-term auto-correlation coefficients. For example, if all the long-term auto-correlation coefficients are represented as $c_1, c_2, \ldots, c_n$, arranged in ascending order, the predetermined proportion of long-term auto-correlation coefficients include $c_1, c_2, \ldots, c_m$ where m/n equals to the predetermined proportion;

6) Low_Value_Percentage: a ratio between the number of the long-term auto-correlation coefficients involved in the Low_Average and the total number of long-term auto-correlation coefficients; and 7) Contrast: a ratio between High_Average and Low_Average.

As a further improvement, the long-term auto-correlation coefficients derived above may be normalized based on the zero-lag value to remove the effect of absolute energy, i.e. the long-term auto-correlation coefficients at zero-lag are identically 1.0. Further, the zero-lag value and nearby values (e.g. lag<10 samples) are not considered in calculating the statistics because these values do not represent any self-repetitiveness of the signal.

Bass Indicator

In further embodiments of audio classification system 100 and audio classification method 200, each of the segments is filtered through a low-pass filter where low-frequency percussive components are permitted to pass. The audio features extracted for the audio classification include a bass indicator feature obtained by applying zero crossing rate (ZCR) on the filtered segment.

ZCR can vary significantly between voiced and un-voiced part of the speech. This can be exploited to efficiently discriminate speech from other signals. However, to classify quasi-speech signals (non-speech signals with speech-like signal characteristics, including the percussive sounds with constant tempo, as well as the rap music), especially the percussive sounds, conventional ZCR is inefficient, since it exhibits similar varying property as found in speech signals. This is due to the fact that the bass-snare drumming measure structure found in many percussive clips (the low-frequency percussive components sampled from the percussive sounds) may result in similar ZCR variation as resulted from the voiced-unvoiced structure of the speech signal.

In the present embodiments, the bass indicator feature is introduced as an indicator of the existence of bass sound. The low-pass filter may have a low cut-off frequency, e.g. 80 Hz, such that apart from low-frequency percussive components (e.g. bass-drum), any other components (including speech) in the signal will be significantly attenuated. As a result, this bass indicator can demonstrate diverse properties between low-frequency percussive sounds and speech signals. This can result in efficient discrimination between quasi-speech and speech signals, since many quasi-speech signals comprise significant amount of bass components, e.g. rap music.

Residual of Frequency Decomposition

In a further embodiment of audio classification system 100, the multi-mode devices may include the feature extractor. For each of the segments, the feature extractor may calculate residuals of frequency decomposition of at least level 1, level 2 and level 3 respectively by removing at least a first energy, a second energy and a third energy respectively from total energy E on a spectrum of each of frames in the segment. For each of the segments, the feature extractor may also calculate at least one item of statistics on the residuals of the same level for the frames in the segment.

In a further embodiment of audio classification method 200, the multi-mode steps may include the feature extracting step. The feature extracting step may include, for each of the segments, calculating residuals of frequency decomposition of at least level 1, level 2 and level 3 respectively by removing at least a first energy, a second energy and a third energy respectively from total energy E on a spectrum of each of frames in the segment. The feature extracting step may also include, for each of the segments, calculating at least one item of statistics on the residuals of the same level for the frames in the segment.

The calculated residuals and statistics are included in the audio features for the audio classification on the corresponding segment.

With frequency decomposition, for some types of percussive signals (e.g. a bass-drumming at a constant tempo), less frequency components can approximate such percussive sounds in comparison with speech signals. The reason is that these percussive signals in natural have less complex frequency composition than speech signals and other types of music signals. Therefore, by removing different number of significant frequency components (e.g., components with highest energy), the residual (remaining energy) of such percussive sounds can exhibit considerably different property when compared to that of speech and other music signals, thus improving the classification performance.

The modes of the feature extractor and the feature extracting step may include one mode $MF_3$ and another mode $MF_4$.

In the mode $MF_3$, the first energy is a total energy of highest $H_1$ frequency bins of the spectrum, the second energy is the total energy of highest $H_2$ frequency bins of the spectrum, and the third energy is the total energy of highest $H_3$ frequency bins of the spectrum, where $H_1<H_2<H_3$.

In the mode $MF_4$, the first energy is total energy of one or more peak areas of the spectrum, the second energy is total energy of one or more peak areas of the spectrum, a portion of which includes the peak areas involved in the first energy, and the third energy is a total energy of one or more peak areas of the spectrum, a portion of which includes the peak areas involved in the second energy. The peak areas may be global or local.

In an example implementation, let S(k) be the spectrum coefficient series of a segment with power-spectrum energy E, i.e.

$$E = \sum_{k=1}^{K} |S(k)|^2$$

where K is the total number of the frequency bins.

In the mode $MF_3$, the residual $R_1$ of level 1 is estimated by the remaining energy after removing the highest $H_1$ frequency bins from S(k). This can be expressed as:

$$R_1 = E - \sum_{\gamma} |S(\gamma)|^2$$

where $\gamma = L_1, L_2 \ldots L_H$ are the indices for the highest $H_1$ frequency bins.

Similarly, let $R_2$ and $R_3$ be the residuals of level 2 and level 3, obtained by removing the highest $H_2$ and $H_3$ frequency bins in $S(\omega)$ respectively, where $H_1<H_2<H_3$. The following facts may be found (ideally) for percussive, speech and music signals:

Percussive sounds: $E>>R_1\approx R_2\approx R_3$

Speech: $E>R_1>R_2\approx R_3$

Music: $E>R_1>R_2>R_3$

In the mode $MF_4$, the residual $R_1$ of level 1 may be estimated by removing the highest peaks of the spectrum, as:

$$R_1 = E - \sum_{\gamma=L-W}^{L+W} |S(\gamma)|^2$$

where L is the index for the highest energy frequency bin, and W is a positive integer defining the width of the peak area, i.e. the peak area has 2 W+1 frequency bins. Alternatively, instead of locating a global peak as described above, local peak areas may also be searched for and removed for residual estimation. In this case, L is searched for as the index for the highest energy frequency bin within a portion of the spectrum, while other process remains the same. Similarly as for level 1, residuals later levels may be estimated by removing more peaks from the spectrum.

In an example, the statistics may include at least one of the following items:

1) a mean of the residuals of the same level for the frames in the same segment;

2) variance: a standard deviation of the residuals of the same level for the frames in the same segment;

3) Residual_High_Average: an average of the residuals of the same level for the frames in the same segment, which satisfy at least one of the following conditions:

a) greater than a threshold; and b) within a predetermined proportion of residuals not lower than all the other residuals. For example, if all the residuals are represented as $r_1, r_2, \ldots, r_n$, arranged in descending order, the predetermined proportion of residuals include $r_1, r_2, \ldots, r_m$ where min equals to the predetermined proportion;

4) Residual_Low_Average: an average of the residuals of the same level for the frames in the same segment, which satisfy at least one of the following conditions:

c) smaller than a threshold; and d) within a predetermined proportion of residuals not higher than all the other residuals. For example, if all the residuals are represented as $r_1, r_2, \ldots, r_n$, arranged in ascending order, the predetermined proportion of residuals include $r_1, r_2, \ldots, r_m$ where m/n equals to the predetermined proportion; and 5) Residual_Contrast: a ratio between Residual_High_Average and Residual_Low_Average.

Spectrum-Bin High Energy Ratio

In further embodiments of audio classification system 100 and audio classification method 200, the audio features extracted for the audio classification on each of the segments include a spectrum-bin high energy ratio. The spectrum-bin high energy ratio is the ratio between the number of frequency bins with energy higher than a threshold and the total number of frequency bins in the spectrum of the segment. In some cases where the complexity is strictly limited, the residual analysis described above can be replaced by a feature called spectrum-bin high energy ratio. The spectrum-bin high energy ratio feature is intended to approximate the performance of the residual of frequency decomposition. The threshold may be determined so that the performance approximates the performance of the residual of frequency decomposition.

In an example, the threshold may be calculated as one of the following:

1) an average energy of the spectrum of the segment or a segment range around the segment;

2) a weighted average energy of the spectrum of the segment or a segment range around the segment, where the segment has a relatively higher weight, and each other segment in the range has a relatively lower weight, or where each frequency bin of relatively higher energy has a relatively higher weight, and each frequency bin of relatively lower energy has a relatively lower weight;

3) a scaled value of the average energy or the weighted average energy; and 4) the average energy or the weighted average energy plus or minus a standard deviation.

In further embodiments of audio classification system 100 and audio classification method 200, the audio features may include at least two of auto-correlation coefficients, bass indicator, residual of frequency decomposition and spectrum-bin high energy ratio. In case that the audio features include long-term auto-correlation coefficients and residual of frequency decomposition, the modes of the feature extractor and the modes of the feature extracting step may include the modes $MF_1$ to $MF_4$ as independent modes. Additionally, there may be combined modes of the modes $MF_1$ and $MF_3$, the modes $MF_1$ and $MF_4$, the modes $MF_2$ and $MF_3$, and the modes $MF_2$ and $MF_4$. In this case, the modes of the feature extractor and the modes of the feature extracting step may include at least two of the modes $MF_1$ to $MF_4$ and the combined modes.

Classification Device

Figure 5:
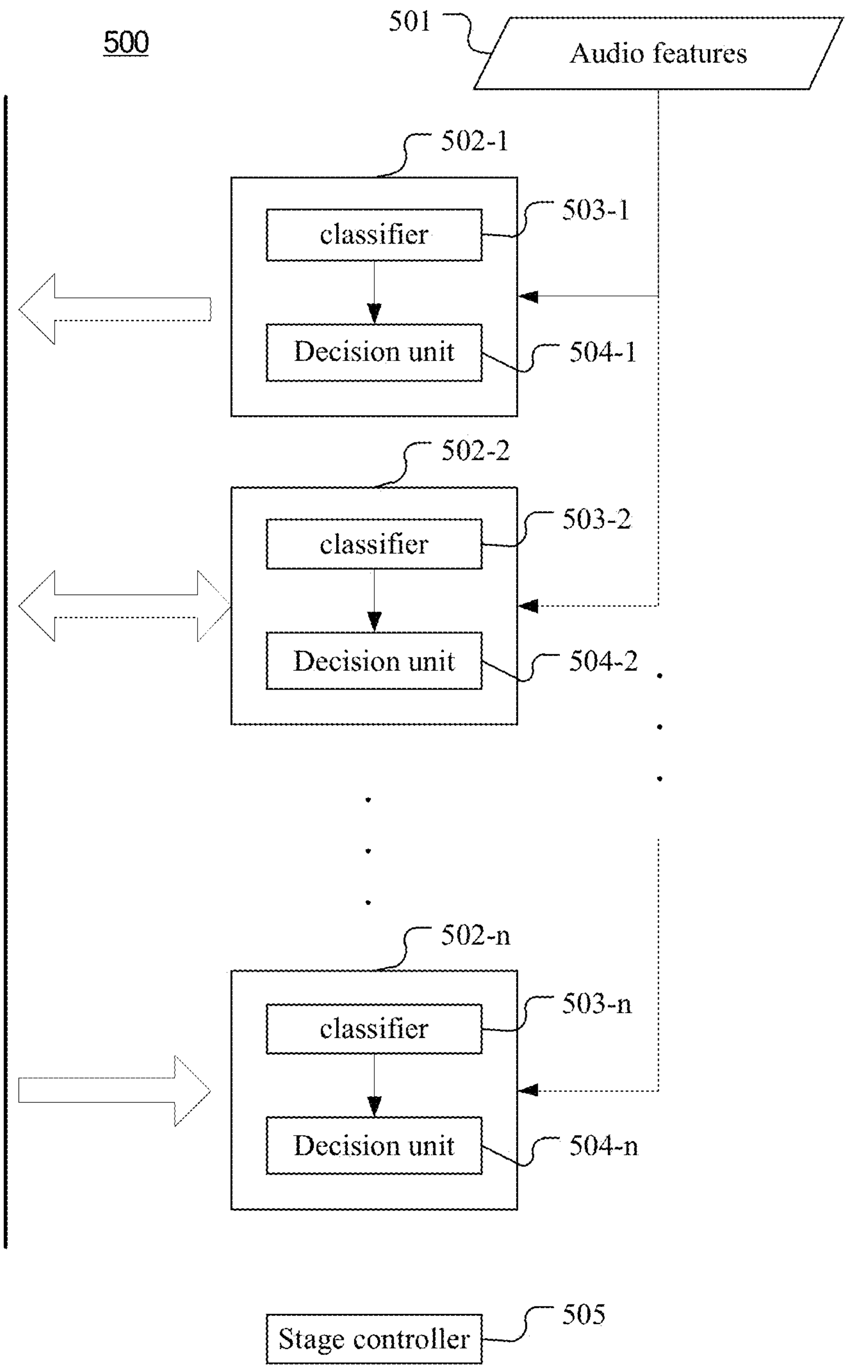
FIG. 5 is a block diagram illustrating an example classification device according to an embodiment of the present invention.

FIG. 5 is a block diagram illustrating an example classification device 500 according to an embodiment of the invention.

As illustrated in FIG. 5, classification device 500 includes a chain of classifier stages 502-1, 502-2, . . . , 502-n with different priority levels. Although more than two classifier stages are illustrated in FIG. 5, there can be two classifier stages. In the chain, classifier stages are arranged in descending order of the priority levels. In FIG. 5, classifier stage 502-1 is arranged at the start of the chain, with the highest priority level, classifier stage 502-2 is arranged at the secondly highest position of the chain, with the secondly highest priority level, and so on. Classifier stage 502-n is arranged at the end of the chain, with the lowest priority level.

Classification device 500 also includes a stage controller 505. Stage controller 505 determines a sub-chain starting from the classifier stage with the highest priority level (e.g., classifier stage 502-1). The length of the sub-chain depends on the mode in the combination for classification device 500. The resources requirement of the modes of classification device 500 is in proportion to the length of the sub-chain. Therefore, classification device 500 may be configured with different modes corresponding to different sub-chains, up to the full chain.

All the classifier stages 502-1, 502-2, . . . , 502-n have the same structure and function, and therefore only classifier stages 502-1 is described in detail here.

Classifier stage 502-1 includes a classifier 503-1 and a decision unit 504-1.

Classifier 503-1 generates current class estimation based on the corresponding audio features 501 extracted from a segment. The current class estimation includes an estimated audio type and corresponding confidence.

Decision unit 504-1 may have different functions corresponding to the position of its classifier stage in the sub-chain.

If the classifier stage is located at the start of the sub-chain (e.g., classifier stage 502-1), the first function is activated. In the first function, it is determined whether the current confidence is higher than a confidence threshold associated with the classifier stage. If it is determined that the current confidence is higher than the confidence threshold, the audio classification is terminated by outputting the current class estimation. If otherwise, the current class estimation is provided to all the later classifier stages (e.g., classifier stages 502-2, . . . , 502-n) in the sub-chain, and the next classifier stage in the sub-chain starts to operate.

If the classifier stage is located in the middle of the sub-chain (e.g., classifier stage 502-2), the second function is activated. In the second function, it is determined whether the current confidence is higher than the confidence threshold, or whether the current class estimation and all the earlier class estimation (e.g., classifier stage 502-1) can decide an audio type according to a first decision criterion. Because the earlier class estimation may include various decided audio type and associated confidence, various decision criteria may be adopted to decide the most possible audio type and associated deciding class estimation, based on the earlier class estimation.

If it is determined that the current confidence is higher than the confidence threshold, or the class estimation can decide an audio type, the audio classification is terminated by outputting the current class estimation, or outputting the decided audio type and the corresponding confidence. If otherwise, the current class estimation is provided to all the later classifier stages in the sub-chain, and the next classifier stage in the sub-chain starts to operate.

If the classifier stage is located at the end of the sub-chain (e.g., classifier stage 502-n), the third function is activated. It is possible to terminate the audio classification by outputting the current class estimation, or determine whether the current class estimation and all the earlier class estimation can decide an audio type according to a second decision criterion. Because the earlier class estimation may include various decided audio type and associated confidence, various decision criteria may be adopted to decide the most possible audio type and associated deciding class estimation, based on the earlier class estimation.

In the latter case, if it is determined that the class estimation can decide an audio type, the audio classification is terminated by outputting the decided audio type and the corresponding confidence. If otherwise, the audio classification is terminated by outputting the current class estimation.

In this way, the resources requirement of the classification device becomes configurable and scalable by decision paths with different length. Further, in case that an audio type with sufficient confidence is estimated, it can be prevented from going through the entire decision path, increasing the efficiency.

It is possible to include only one classifier stage in the sub-chain. In this case, the decision unit may terminate the audio classification by outputting the current class estimation.

Figure 6:
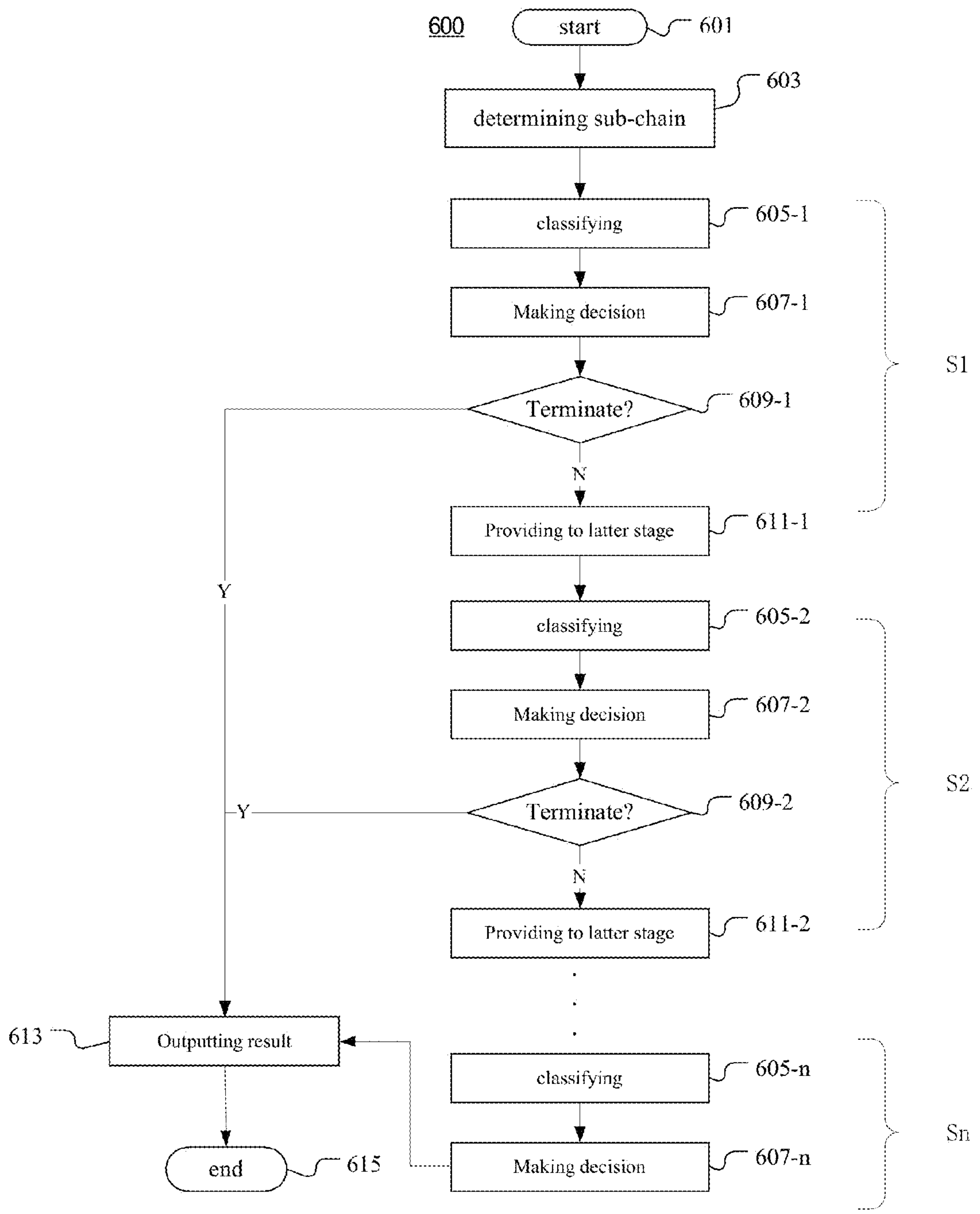
FIG. 6 is a flow chart illustrating an example process of the classifying step according to an embodiment of the present invention.

FIG. 6 is a flow chart illustrating an example process 600 of the classifying step according to an embodiment of the present invention.

As illustrated in FIG. 6, process 600 includes a chain of sub-steps S1, S2, . . . , Sn with different priority levels. Although more than two sub-steps are illustrated in FIG. 6, there can be two sub-steps. In the chain, sub-steps are arranged in descending order of the priority levels. In FIG. 6, sub-step S1 is arranged at the start of the chain, with the highest priority level, sub-step S2 is arranged at the secondly highest position of the chain, with the secondly highest priority level, and so on. Sub-step Sn is arranged at the end of the chain, with the lowest priority level.

Process 600 starts from sub-step 601. At sub-step 603, a sub-chain starting from the sub-step with the highest priority level (e.g., sub-step S1) is determined. The length of the sub-chain depends on the mode in the combination for the classifying step. The resources requirement of the modes of the classifying step is in proportion to the length of the sub-chain. Therefore, the classifying step may be configured with different modes corresponding to different sub-chains, up to the full chain.

All the operations of classifying and making decision in sub-steps S1, S2, . . . , Sn have the same function, and therefore only that in sub-steps S1 is described in detail here.

At operation 605-1, current class estimation is generated with a classifier based on the corresponding audio features extracted from a segment. The current class estimation includes an estimated audio type and corresponding confidence.

Operation 607-1 may have different functions corresponding to the position of its sub-step in the sub-chain.

If the sub-step is located at the start of the sub-chain (e.g., sub-step S1), the first function is activated. In the first function, it is determined whether the current confidence is higher than a confidence threshold associated with the sub-step. If it is determined that the current confidence is higher than the confidence threshold, at operation 609-1, it is determined that the audio classification is terminated and then, at sub-step 613, the current class estimation is output. If otherwise, at operation 609-1, it is determined that the audio classification is not terminated and then, at operation 611-1, the current class estimation is provided to all the later sub-steps (e.g., sub-steps S2, . . . , Sn) in the sub-chain, and the next sub-step in the sub-chain starts to operate.

If the sub-step is located in the middle of the sub-chain (e.g., sub-step S2), the second function is activated. In the second function, it is determined whether the current confidence is higher than the confidence threshold, or whether the current class estimation and all the earlier class estimation (e.g., sub-step S1) can decide an audio type according to the first decision criterion.

If it is determined that the current confidence is higher than the confidence threshold, or the class estimation can decide an audio type, at operation 609-2, it is determined that the audio classification is terminated, and then, at sub-step 613, the current class estimation is output, or the decided audio type and the corresponding confidence is output. If otherwise, at operation 609-2, it is determined that the audio classification is not terminated, and then, at operation 611-2, the current class estimation is provided to all the later sub-steps in the sub-chain, and the next sub-step in the sub-chain starts to operate.

If the sub-step is located at the end of the sub-chain (e.g., sub-step Sn), the third function is activated. It is possible to terminate the audio classification and go to sub-step 613 to output the current class estimation, or determine whether the current class estimation and all the earlier class estimation can decide an audio type according to the second decision criterion.

In the latter case, if it is determined that the class estimation can decide an audio type, the audio classification is terminated and process 600 goes to sub-step 613 to output the decided audio type and the corresponding confidence. If otherwise, the audio classification is terminated and process 600 goes to sub-step 613 to output the current class estimation.

At sub-step 613, the classification result is output. Then process 600 ends at sub-step 615.

It is possible to include only one sub-step in the sub-chain. In this case, the sub-step may terminate the audio classification by outputting the current class estimation.

In an example, the first decision criterion may comprise one of the following criteria:

1) if an average confidence of the current confidence and the earlier confidence corresponding to the same audio type as the current audio type is higher than a threshold, the current audio type can be decided;

2) if a weighted average confidence of the current confidence and the earlier confidence corresponding to the same audio type as the current audio type is higher than an threshold, the current audio type can be decided; and 3) if the number of the earlier classifier stages deciding the same audio type as the current audio type is higher than a threshold, the current audio type can be decided, and wherein the output confidence is the current confidence or an weighted or un-weighted average of the confidence of the class estimation which can decide the output audio type, where the earlier confidence has the higher weight than the later confidence.

In another example, the second decision criterion may comprise one of the following criteria:

1) among all the class estimation, if the number of the class estimation including the same audio type is the highest, the same audio type can be decided by the corresponding class estimation;

2) among all the class estimation, if the weighted number of the class estimation including the same audio type is the highest, the same audio type can be decided by the corresponding class estimation; and 3) among all the class estimation, if the average confidence of the confidence corresponding to the same audio type is the highest, the same audio type can be decided by the corresponding class estimation, and wherein the output confidence is the current confidence or an weighted or un-weighted average of the confidence of the class estimation which can decide the output audio type, where the earlier confidence has the higher weight than the later confidence.

In further embodiments of classification device 500 and classifying step 600, if the classification algorithm adopted by one of the classifier stages and the sub-steps in the chain has higher accuracy in classifying at least one of the audio types, the classifier stage and the sub-step is specified with a higher priority level.

In further embodiments of classification device 500 and classifying step 600, each training sample for the classifier in each of the latter classifier stages and sub-step comprises at least an audio sample marked with the correct audio type, audio types to be identified by the classifier, and statistics on the confidence corresponding to each of the audio types, which is generated by all the earlier classifier stages based on the audio sample.

In further embodiments of classification device 500 and classifying step 600, training samples for the classifier in each of the latter classifier stages and sub-steps comprises at least audio sample marked with the correct audio type but miss-classified or classified with low confidence by all the earlier classifier stages.

Post Processing

In further embodiments of audio classification system 100 and audio classification method 200, class estimation is generated for each of the segments in the audio signal through the audio classification, where each of the class estimation includes an estimated audio type and corresponding confidence.

The multi-mode device and the multi-mode step include the post processor and the post processing step respectively.

The modes of the post processor and the post processing step include one mode $MO_1$ and another mode $MO_2$. In the mode $MO_1$, the highest sum or average of the confidence corresponding to the same audio type in the window is determined, and the current audio type is replaced with the same audio type. In the mode $MO_2$, the window with a relatively shorter length is adopted, and/or the highest number of the confidence corresponding to the same audio type in the window is determined, and the current audio type is replaced with the same audio type.

In further embodiments of audio classification system 100 and audio classification method 200, the multi-mode device and the multi-mode step include the post processor and the post processing step respectively.

The post processor is configured to search for two repetitive sections in the audio signal, and smooth the classification result by regarding the segments between the two repetitive sections as non-speech type. The post processing step comprises searching for two repetitive sections in the audio signal, and smoothing the classification result by regarding the segments between the two repetitive sections as non-speech type.

The modes of the post processor and the post processing step include one mode $MO_3$ and another mode $MO_4$. In the mode $MO_3$, a relatively longer searching range is adopted. In the mode $MO_4$, a relatively shorter searching range is adopted.

In case that the post processing includes the smoothing based on confidence and repetitive patterns, the modes may include the modes $MO_1$ to $MO_4$ as independent modes. Additionally, there may be combined modes of the modes $MO_1$ and $MO_3$, the modes $MO_1$ and $MO_4$, the modes $MO_2$ and $MO_3$, and the modes $MO_2$ and $MO_4$. In this case, the modes may include at least two of the modes $MO_1$ to $MO_4$ and the combined modes.

Figure 7:
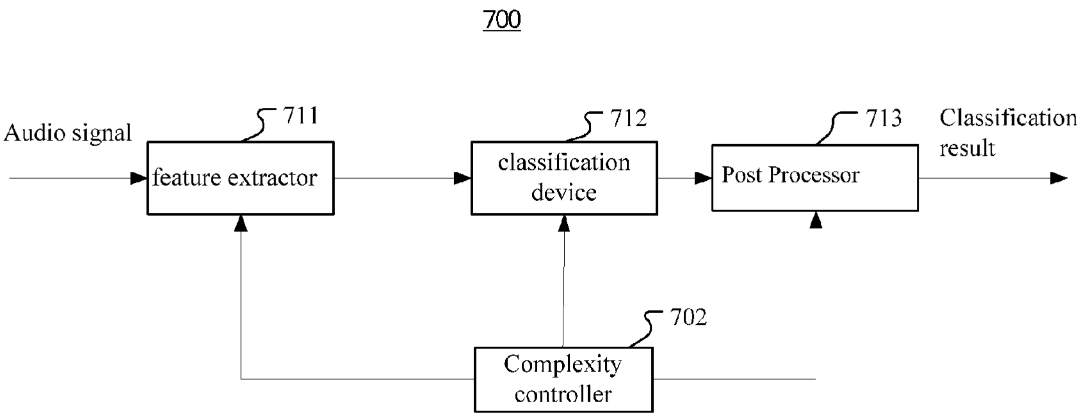
FIG. 7 is a block diagram illustrating an example audio classification system according to according to an embodiment of the present invention.

FIG. 7 is a block diagram illustrating an example audio classification system 700 according to an embodiment of the present invention.

As illustrated in FIG. 7, in audio classification system 700, the multi-mode device comprises a feature extractor 711, a classification device 712 and a post processor 713. Feature extractor 711 has the same structure and function with the feature extractor described in section "Residual of frequency decomposition", and will not be described in detail here. Classification device 712 has the same structure and function with the classification device described in connection with FIG. 5, and will not be described in detail here. Post processor 713 is configured to search for two repetitive sections in the audio signal, and smooth the classification result by regarding the segments between the two repetitive sections as non-speech type. The modes of the post processor include one mode where a relatively longer searching range is adopted, and another mode where a relatively shorter searching range is adopted.

Audio classification system 700 also includes a complexity controller 702. Complexity controller 702 has the same function with complexity controller 102, and will not be described in detailed here. It should be noted that, because feature extractor 711, classification device 712 and post processor 713 are multi-mode devices, the combination determined by complexity controller 702 may define corresponding active modes for feature extractor 711, classification device 712 and post processor 713.

Figure 8:
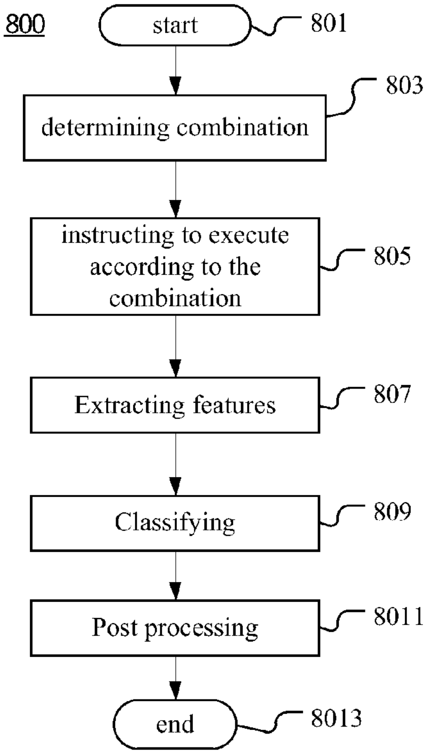
FIG. 8 is a flow chart illustrating an example audio classification method according to an embodiment of the present invention.

FIG. 8 is a flow chart illustrating an example audio classification method 800 according to an embodiment of the present invention.

As illustrated in FIG. 8, audio classification method 800 starts from step 801. Step 803 and step 805 have the same function with step 203 and step 205, and will not be described in detail here. The multi-mode step comprises a feature extracting step 807, a classifying step 809 and a post processing step 811. Feature extracting step 807 has the same function with the feature extracting step described in section "Residual of frequency decomposition", and will not be described in detail here. Classifying step 809 has the same function with the classifying process described in connection with FIG. 6, and will not be described in detail here. Post processing step 811 includes searching for two repetitive sections in the audio signal, and smoothing the classification result by regarding the segments between the two repetitive sections as non-speech type. The modes of the post processing step include one mode where a relatively longer searching range is adopted, and another mode where a relatively shorter searching range is adopted. It should be noted that, because feature extracting step 807, classifying step 809 and post processing step 811 are multi-mode steps, the combination determined at step 803 may define corresponding active modes for feature extracting step 807, classifying step 809 and post processing step 811.

Other Embodiments

Figure 9:
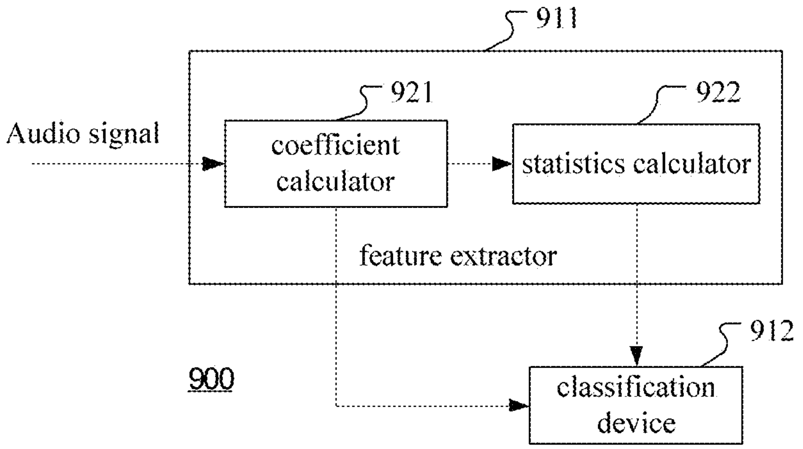
FIG. 9 is a block diagram illustrating an example audio classification system according to an embodiment of the invention.

FIG. 9 is a block diagram illustrating an example audio classification system 900 according to an embodiment of the invention.

As illustrated in FIG. 9, audio classification system 900 includes a feature extractor 911 for extracting audio features from segments of the audio signal, and a classification device 912 for classifying the segments with a trained model based on the extracted audio features. Feature extractor 911 includes a coefficient calculator 921 and a statistics calculator 922.

Coefficient calculator 921 calculates long-term auto-correlation coefficients of the segments longer than a threshold in the audio signal based on the Wiener-Khinchin theorem, as the audio features. Statistics calculator 922 calculates at least one item of statistics on the long-term auto-correlation coefficients for the audio classification, as the audio features.

Figure 10:
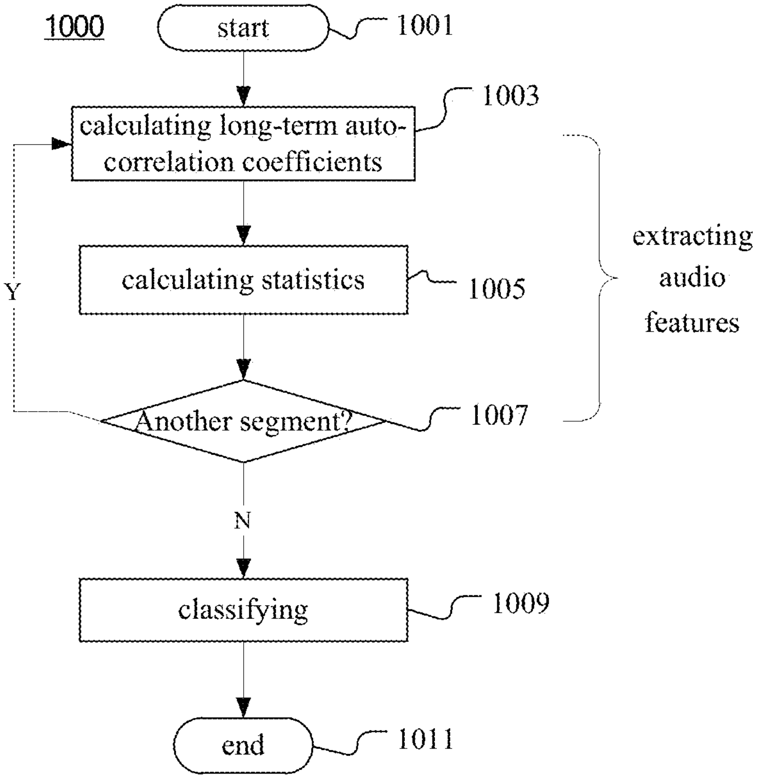
FIG. 10 is a flow chart illustrating an example audio classification method according to an embodiment of the present invention.

FIG. 10 is a flow chart illustrating an example audio classification method 1000 according to an embodiment of the present invention.

As illustrated in FIG. 10, audio classification method 1000 starts from step 1001. Steps 1003 to 1007 are executed to extract audio features from segments of the audio signal.

At step 1003, long-term auto-correlation coefficients of a segment longer than a threshold in the audio signal are calculated as the audio features based on the Wiener-Khinchin theorem.

At step 1005, at least one item of statistics on the long-term auto-correlation coefficients for the audio classification is calculated as the audio feature.

At step 1007, it is determined whether there is another segment not processed yet. If yes, method 1000 returns to step 1003. If no, method 1000 proceeds to step 1009.

At step 1009, the segments are classified with a trained model based on the extracted audio features.

Method 1000 ends at step 1011.

Some percussive sounds, especially those with relatively constant tempo, have a unique property that they are highly periodic, in particular when observed between percussive onsets or measures. This property can be exploited by long-term auto-correlation coefficients of a segment with relatively longer length, e.g. 2 seconds. According to the definition, long-term auto-correlation coefficients may exhibit significant peaks on the delay-points following the percussive onsets or measures. This property cannot be found in speech signals, as they hardly repeat themselves. The statistics is calculated to capture the characteristics in the long-term auto-correlation coefficients which can distinguish the percussive signal from the speech signal. Therefore, according to system 900 and method 1000, it is possible to reduce the possibility of classifying the percussive signal as the speech signal.

In an example, the statistics may include at least one of the following items:

1) mean: an average of all the long-term auto-correlation coefficients;

2) variance: a standard deviation value of all the long-term auto-correlation coefficients;

3) High_Average: an average of the long-term auto-correlation coefficients that satisfy at least one of the following conditions:

a) greater than a threshold; and b) within a predetermined proportion of long-term auto-correlation coefficients not lower than all the other long-term auto-correlation coefficients;

4) High_Value_Percentage: a ratio between the number of the long-term auto-correlation coefficients involved in High_Average and the total number of long-term auto-correlation coefficients;

5) Low_Average: an average of the long-term auto-correlation coefficients that satisfy at least one of the following conditions:

c) smaller than a threshold; and d) within a predetermined proportion of long-term auto-correlation coefficients not higher than all the other long-term auto-correlation coefficients;

6) Low_Value_Percentage: a ratio between the number of the long-term auto-correlation coefficients involved in Low_Average and the total number of long-term auto-correlation coefficients; and 7) Contrast: a ratio between High_Average and Low_Average.

As a further improvement, the long-term auto-correlation coefficients derived above may be normalized based on the zero-lag value to remove the effect of absolute energy, i.e. the long-term auto-correlation coefficients at zero-lag are identically 1.0. Further, the zero-lag value and nearby values (e.g. lag<10 samples) are not considered in calculating the statistics because these values do not represent any self-repetitiveness of the signal.

Figure 11:
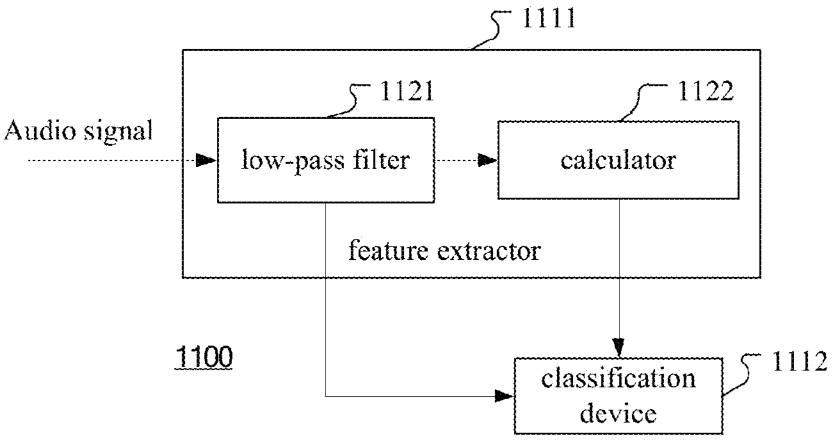
FIG. 11 is a block diagram illustrating an example audio classification system according to an embodiment of the invention.

FIG. 11 is a block diagram illustrating an example audio classification system 1100 according to an embodiment of the invention.

As illustrated in FIG. 11, audio classification system 1100 includes a feature extractor 1111 for extracting audio features from segments of the audio signal, and a classification device 1112 for classifying the segments with a trained model based on the extracted audio features. Feature extractor 1111 includes a low-pass filter 1121 and a calculator 1122.

Low-pass filter 1121 filters the segments by permitting low-frequency percussive components to pass. Calculator 1122 extracts bass indicator features by applying zero crossing rate (ZCR) on the segments as the audio features.

Figure 12:
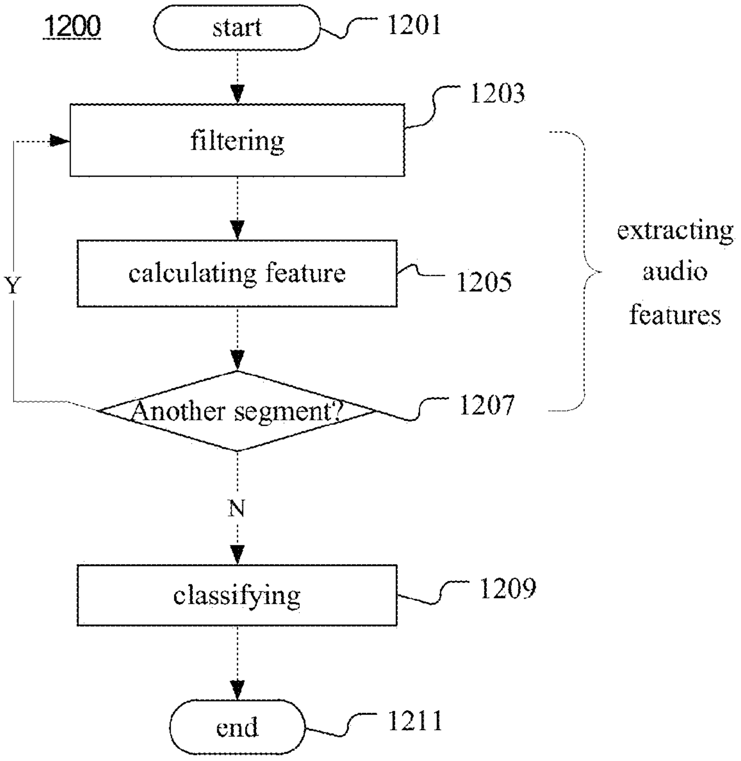
FIG. 12 is a flow chart illustrating an example audio classification method according to an embodiment of the present invention.

FIG. 12 is a flow chart illustrating an example audio classification method 1200 according to an embodiment of the present invention.

As illustrated in FIG. 12, audio classification method 1200 starts from step 1201. Steps 1203 to 1207 are executed to extract audio features from segments of the audio signal.

At step 1203, a segment is filtered through a low-pass filter where low-frequency percussive components are permitted to pass.

At step 1205, a bass indicator feature is extracted by applying zero crossing rate (ZCR) on the segment, as the audio feature.

At step 1207, it is determined whether there is another segment not processed yet. If yes, method 1200 returns to step 1203. If no, method 1200 proceeds to step 1209.

At step 1209, the segments are classified with a trained model based on the extracted audio features.

Method 1200 ends at step 1211.

ZCR can vary significantly between voiced and un-voiced part of the speech. This can be exploited to efficiently discriminate speech from other signals. However, to classify quasi-speech signals (non-speech signals with speech-like signal characteristics, including the percussive sounds with constant tempo, as well as the rap music), especially the percussive sounds, conventional ZCR is inefficient, since it exhibits similar varying property as found in speech signals. This is due to the fact that the bass-snare drumming measure structure found in many percussive clips may result in similar ZCR variation as resulted from the voiced-unvoiced structure of the speech signal.

In the present embodiments, the bass indicator feature is introduced as an indicator of the existence of bass sound. The low-pass filter may have a low cut-off frequency, e.g. 80 Hz, such that apart from low-frequency percussive components (e.g. bass-drum), any other components (including speech) in the signal will be significantly attenuated. As a result, this bass indicator can demonstrate diverse properties between low-frequency percussive sounds and speech signals. This can result in efficient discrimination between quasi-speech and speech signals, since many quasi-speech signals comprise significant amount of bass components, e.g. rap music.

Figure 13:
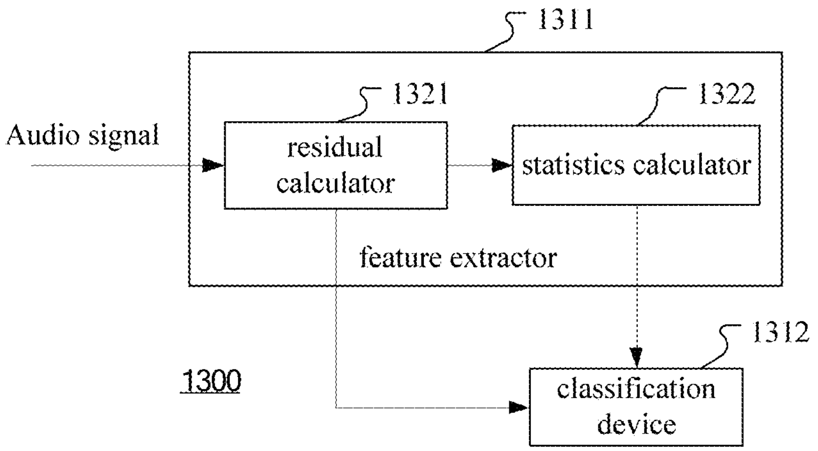
FIG. 13 is a block diagram illustrating an example audio classification system according to an embodiment of the invention.

FIG. 13 is a block diagram illustrating an example audio classification system 1300 according to an embodiment of the invention.

As illustrated in FIG. 13, audio classification system 1300 includes a feature extractor 1311 for extracting audio features from segments of the audio signal, and a classification device 1312 for classifying the segments with a trained model based on the extracted audio features. Feature extractor 1311 includes a residual calculator 1321 and a statistics calculator 1322.

For each of the segments, residual calculator 1321 calculates residuals of frequency decomposition of at least level 1, level 2 and level 3 respectively by removing at least a first energy, a second energy and a third energy respectively from total energy E on a spectrum of each of frames in the segment. For each of the segments, statistics calculator 1322 calculates at least one item of statistics on the residuals of a same level for the frames in the segment.

Figure 14:
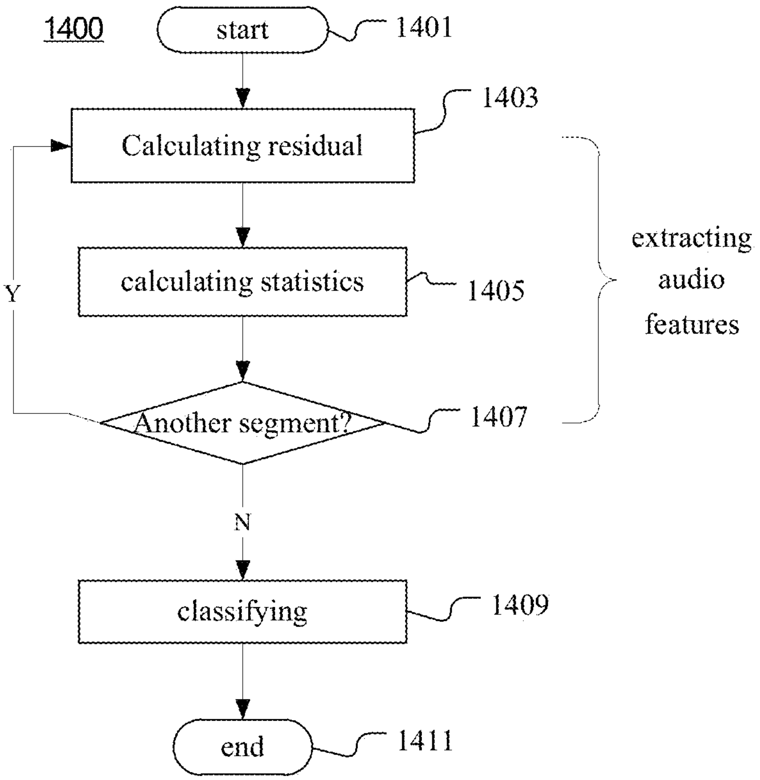
FIG. 14 is a flow chart illustrating an example audio classification method according to an embodiment of the present invention.

FIG. 14 is a flow chart illustrating an example audio classification method 1400 according to an embodiment of the present invention.

As illustrated in FIG. 14, audio classification method 1400 starts from step 1401. Steps 1403 to 1407 are executed to extract audio features from segments of the audio signal.

At step 1403, residuals of frequency decomposition of at least level 1, level 2 and level 3 are calculated respectively for a segment by removing at least a first energy, a second energy and a third energy respectively from total energy E on a spectrum of each of frames in the segment.

At step 1405, at least one item of statistics on the residuals of a same level is calculated for the frames in the segment.

At step 1407, it is determined whether there is another segment not processed yet. If yes, method 1400 returns to step 1403. If no, method 1400 proceeds to step 1409.

At step 1409, the segments are classified with a trained model based on the extracted audio features.

Method 1400 ends at step 1411.

With frequency decomposition, for some types of percussive signals (e.g. a bass-drumming at a constant tempo), less frequency components can approximate such percussive sounds in comparison with speech signals. The reason is that these percussive signals in nature have less complex frequency composition than speech signals and other types of music signals. Therefore, by removing different number of significant frequency components (e.g., components with highest energy), the residual (remaining energy) of such percussive sounds can exhibit considerably different property when compared to that of speech and other music signals, thus improving the classification performance.

Further, the first energy is a total energy of highest $H_1$ frequency bins of the spectrum, the second energy is a total energy of highest $H_2$ frequency bins of the spectrum, and the third energy is a total energy of highest $H_3$ frequency bins of the spectrum, where $H_1<H_2<H_3$.

Alternatively, the first energy is a total energy of one or more peak areas of the spectrum, the second energy is a total energy of one or more peak areas of the spectrum, a portion of which includes the peak areas involved in the first energy, and the third energy is a total energy of one or more peak areas of the spectrum, a portion of which includes the peak areas involved in the second energy. The peak areas may be global or local.

Let S(k) be the spectrum coefficient series of a segment with power-spectrum energy E, i.e.

$$E=\sum_{k=1}^{K}|S(k)|^2$$

where K is the total number of the frequency bins.

In an example, the residual $R_1$ of level 1 is estimated by the remaining energy after removing the highest $H_1$ frequency bins from S(k). This can be expressed as:

$$R_1=E-\sum_{\gamma}|S(\gamma)|^2$$

where $\gamma=L_1, L_2 \ldots L_{H_1}$ are the indices for the highest $H_1$ frequency bins.

Similarly, let $R_2$ and $R_3$ be the residuals of level 2 and level 3, obtained by removing the highest $H_2$ and $H_3$ frequency bins in $S(\omega)$ respectively, where $H_1<H_2<H_3$. The following facts may be found (ideally) for percussive, speech and music signals:

Percussive sounds: $E>>R_1\approx R_2\approx R_3$

Speech: $E>R_1>R_2\approx R_3$

Music: $E>R_1>R_2>R_3$

In another example, the residual $R_1$ of level 1 may be estimated by removing the highest peaks of the spectrum, as:

$$R_1 = E - \sum_{\gamma=L-W}^{L+W} |S(\gamma)|^2$$

where L is the index for the highest energy frequency bin, and W is a positive integer defining the width of the peak area, i.e. the peak area has 2 W+1 frequency bins. Alternatively, instead of locating a global peak as described above, local peak areas may also be searched for and removed for residual estimation. In this case, L is searched for as the index for the highest energy frequency bin within a portion of the spectrum, while other process remains the same. Similarly as for level 1, residuals later levels may be estimated by removing more peaks from the spectrum.

Further, the statistics may include at least one of the following items:

1) a mean of the residuals of the same level for the frames in the same segment;

2) variance: a standard deviation of the residuals of the same level for the frames in the same segment;

3) Residual_High_Average: an average of the residuals of the same level for the frames in the same segment, which satisfy at least one of the following conditions:

a) greater than a threshold; and b) within a predetermined proportion of residuals not lower than all the other residuals;

4) Residual_Low_Average: an average of the residuals of the same level for the frames in the same segment, which satisfy at least one of the following conditions:

c) smaller than a threshold; and d) within a predetermined proportion of residuals not higher than all the other residuals; and 5) Residual_Contrast: a ratio between Residual_High_Average and Residual_Low_Average.

Figure 15:
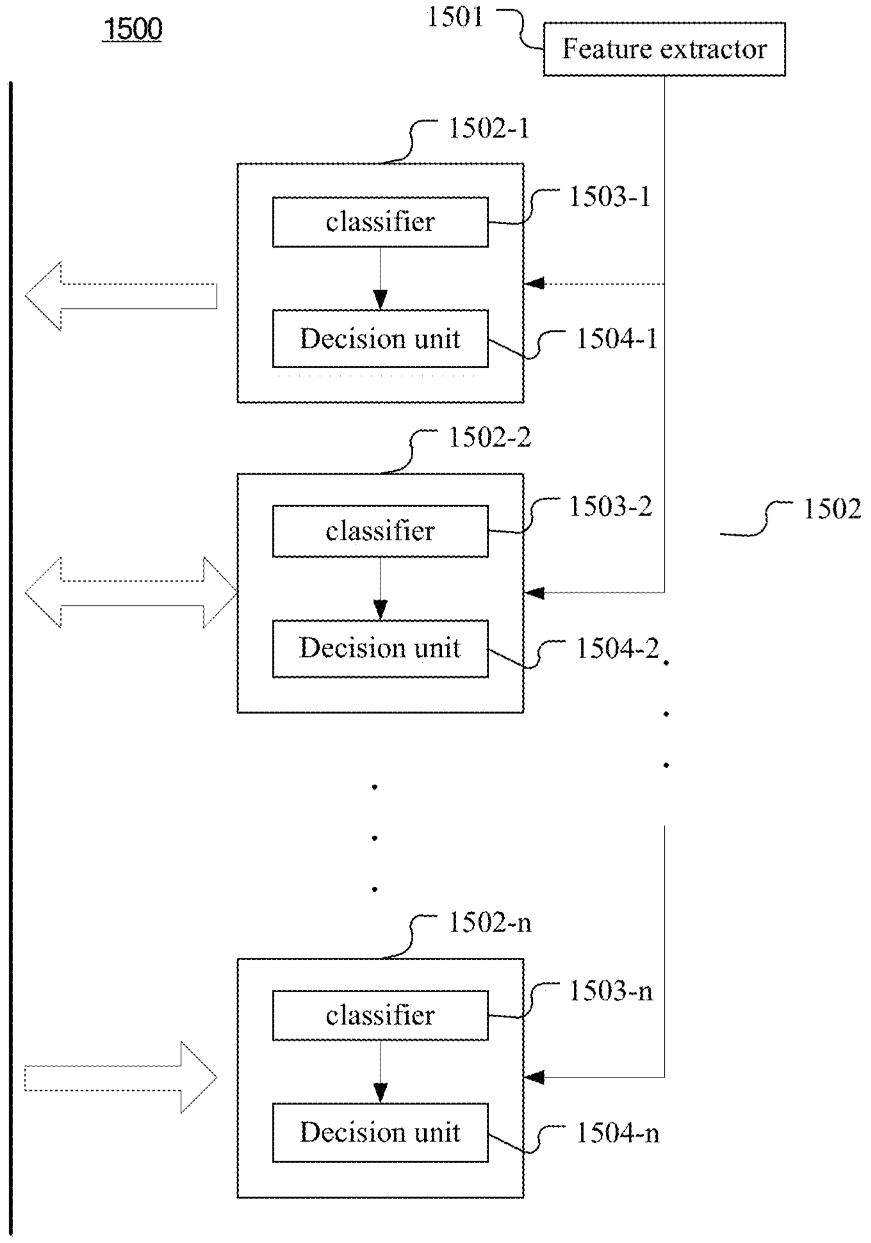
FIG. 15 is a block diagram illustrating an example audio classification system according to an embodiment of the invention.

FIG. 15 is a block diagram illustrating an example audio classification system 1500 according to an embodiment of the invention.

As illustrated in FIG. 15, audio classification system 1500 includes a feature extractor 1501 for extracting audio features from segments of the audio signal, and a classification device 1502 for classifying the segments with a trained model based on the extracted audio features.

As illustrated in FIG. 15, classification device 1502 includes a chain of classifier stages 1502-1, 1502-2, . . . , 1502-n with different priority levels. Although more than two classifier stages are illustrated in FIG. 15, there can be two classifier stages. In the chain, classifier stages are arranged in descending order of the priority levels. In FIG. 15, classifier stage 1502-1 is arranged at the start of the chain, with the highest priority level, classifier stage 1502-2 is arranged at the secondly highest position of the chain, with the secondly highest priority level, and so on. Classifier stage 1502-n is arranged at the end of the chain, with the lowest priority level.

All the classifier stages 1502-1, 1502-2, . . . , 1502-n have the same structure and function, and therefore only classifier stages 1502-1 is described in detail here.

Classifier stage 1502-1 includes a classifier 1503-1 and a decision unit 1504-1.

Classifier 1503-1 generates current class estimation based on the corresponding audio features extracted from one segment. The current class estimation includes an estimated audio type and corresponding confidence.

Decision unit 1504-1 may have different functions corresponding to the position of its classifier stage in the chain.

If the classifier stage is located at the start of the chain (e.g., classifier stage 1502-1), the first function is activated. In the first function, it is determined whether the current confidence is higher than a confidence threshold associated with the classifier stage. If it is determined that the current confidence is higher than the confidence threshold, the audio classification is terminated by outputting the current class estimation. If otherwise, the current class estimation is provided to all the later classifier stages (e.g., classifier stages 1502-2, . . . , 1502-n) in the chain, and the next classifier stage in the chain starts to operate.

If the classifier stage is located in the middle of the chain (e.g., classifier stage 1502-2), the second function is activated. In the second function, it is determined whether the current confidence is higher than the confidence threshold, or whether the current class estimation and all the earlier class estimation (e.g., classifier stage 1502-1) can decide an audio type according to a first decision criterion. Because the earlier class estimation may include various decided audio type and associated confidence, various decision criteria may be adopted to decide the most possible audio type and associated deciding class estimation, based on the earlier class estimation.

If it is determined that the current confidence is higher than the confidence threshold, or the class estimation can decide an audio type, the audio classification is terminated by outputting the current class estimation, or outputting the decided audio type and the corresponding confidence. If otherwise, the current class estimation is provided to all the later classifier stages in the chain, and the next classifier stage in the chain starts to operate.

If the classifier stage is located at the end of the chain (e.g., classifier stage 1502-n), the third function is activated. It is possible to terminate the audio classification by outputting the current class estimation, or determine whether the current class estimation and all the earlier class estimation can decide an audio type according to a second decision criterion. Because the earlier class estimation may include various decided audio type and associated confidence, various decision criteria may be adopted to decide the most possible audio type and associated deciding class estimation, based on the earlier class estimation.

In the latter case, if it is determined that the class estimation can decide an audio type, the audio classification is terminated by outputting the decided audio type and the corresponding confidence. If otherwise, the audio classification is terminated by outputting the current class estimation.

In this way, the resources requirement of the classification device becomes configurable and scalable by decision paths with different length. Further, in case that an audio type with sufficient confidence is estimated, it can be prevented from going through the entire decision path, increasing the efficiency.

It is possible to include only one classifier stage in the chain. In this case, the decision unit may terminate the audio classification by outputting the current class estimation.

Figure 16:
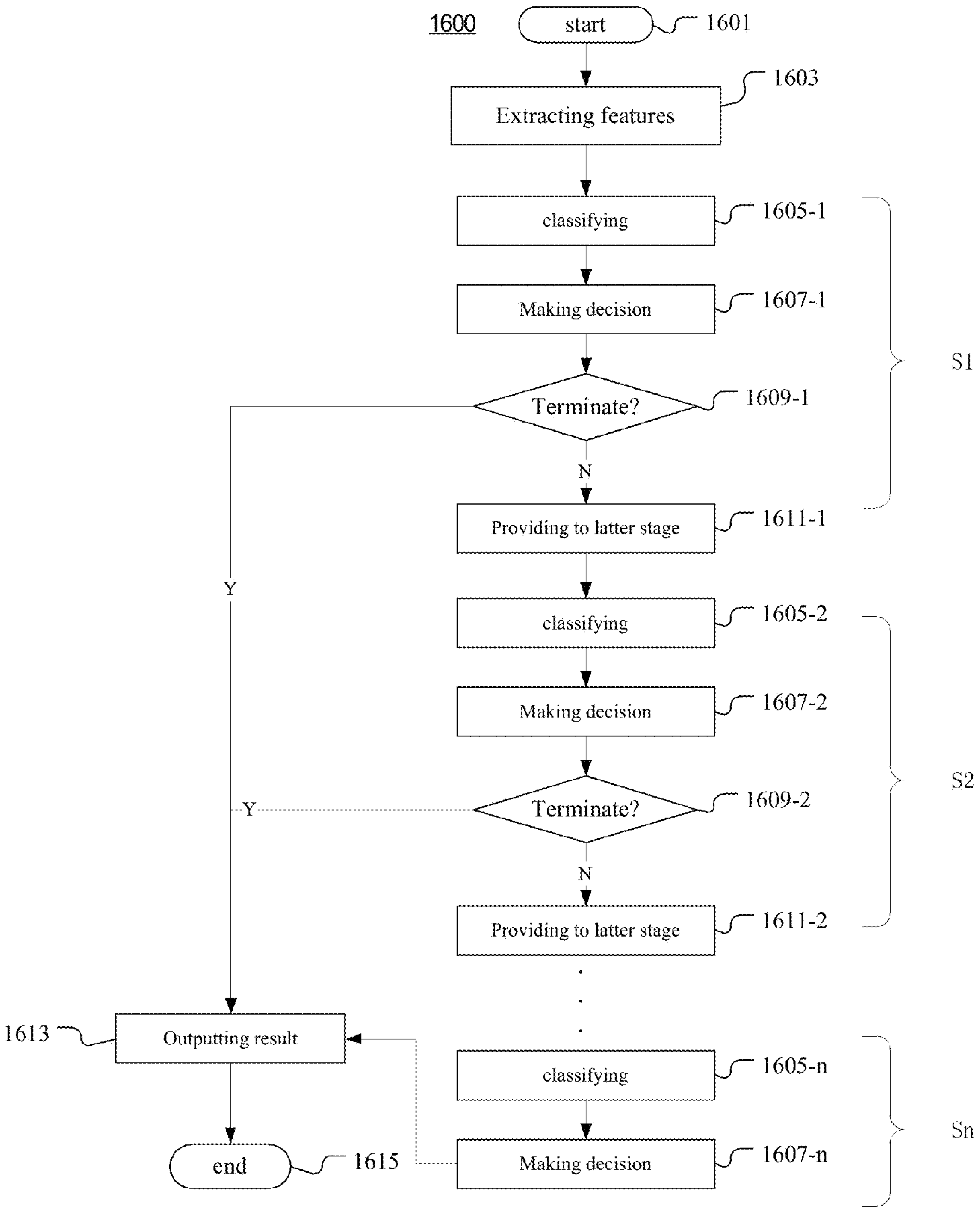
FIG. 16 is a flow chart illustrating an example audio classification method according to an embodiment of the present invention.

FIG. 16 is a flow chart illustrating an example audio classification method 1600 according to an embodiment of the present invention.

As illustrated in FIG. 16, audio classification method 1600 starts from step 1601.

At Step 1603, audio features are extracted from segments of the audio signal.

As illustrated in FIG. 16, the process of classification includes a chain of sub-steps S1, S2, . . . , Sn with different priority levels. Although more than two sub-steps are illustrated in FIG. 16, there can be two sub-steps. In the chain, sub-steps are arranged in descending order of the priority levels. In FIG. 16, sub-step S1 is arranged at the start of the chain, with the highest priority level, sub-step S2 is arranged at the secondly highest position of the chain, with the secondly highest priority level, and so on. Sub-step Sn is arranged at the end of the chain, with the lowest priority level.

All the operations of classifying and making decision in sub-steps S1, S2, . . . , Sn have the same function, and therefore only that in sub-steps S1 is described in detail here.

At operation 1605-1, current class estimation is generated with a classifier based on the corresponding audio features extracted from one segment. The current class estimation includes an estimated audio type and corresponding confidence.

Operation 1607-1 may have different functions corresponding to the position of its sub-step in the chain.

If the sub-step is located at the start of the chain (e.g., sub-step S1), the first function is activated. In the first function, it is determined whether the current confidence is higher than a confidence threshold associated with the sub-step. If it is determined that the current confidence is higher than the confidence threshold, at operation 1609-1, it is determined that the audio classification is terminated and then, at sub-step 1613, the current class estimation is output. If otherwise, at operation 1609-1, it is determined that the audio classification is not terminated and then, at operation 1611-1, the current class estimation is provided to all the later sub-steps (e.g., sub-steps S2, . . . , Sn) in the chain, and the next sub-step in the chain starts to operate.

If the sub-step is located in the middle of the chain (e.g., sub-step S2), the second function is activated. In the second function, it is determined whether the current confidence is higher than the confidence threshold, or whether the current class estimation and all the earlier class estimation (e.g., sub-step S1) can decide an audio type according to the first decision criterion.

If it is determined that the current confidence is higher than the confidence threshold, or the class estimation can decide an audio type, at operation 1609-2, it is determined that the audio classification is terminated, and then, at sub-step 1613, the current class estimation is output, or the decided audio type and the corresponding confidence is output. If otherwise, at operation 1609-2, it is determined that the audio classification is not terminated, and then, at operation 1611-2, the current class estimation is provided to all the later sub-steps in the chain, and the next sub-step in the chain starts to operate.

If the sub-step is located at the end of the chain (e.g., sub-step Sn), the third function is activated. It is possible to terminate the audio classification and go to sub-step 1613 to output the current class estimation, or determine whether the current class estimation and all the earlier class estimation can decide an audio type according to the second decision criterion.

In the latter case, if it is determined that the class estimation can decide an audio type, the audio classification is terminated and method 1600 goes to sub-step 1613 to output the decided audio type and the corresponding confidence. If otherwise, the audio classification is terminated and method 1600 goes to sub-step 1613 to output the current class estimation.

At sub-step 1613, the classification result is output. Then method 1600 ends at sub-step 1615.

It is possible to include only one sub-step in the chain. In this case, the sub-step may terminate the audio classification by outputting the current class estimation.

In an example, the first decision criterion may comprise one of the following criteria:

1) if an average confidence of the current confidence and the earlier confidence corresponding to the same audio type as the current audio type is higher than a threshold, the current audio type can be decided;

2) if a weighted average confidence of the current confidence and the earlier confidence corresponding to the same audio type as the current audio type is higher than an threshold, the current audio type can be decided; and 3) if the number of the earlier classifier stages deciding the same audio type as the current audio type is higher than a threshold, the current audio type can be decided, and wherein the output confidence is the current confidence or an weighted or un-weighted average of the confidence of the class estimation which can decide the output audio type, where the earlier confidence has the higher weight than the later confidence.

In another example, the second decision criterion may comprise one of the following criteria:

1) among all the class estimation, if the number of the class estimation including the same audio type is the highest, the same audio type can be decided by the corresponding class estimation;

2) among all the class estimation, if the weighted number of the class estimation including the same audio type is the highest, the same audio type can be decided by the corresponding class estimation; and 3) among all the class estimation, if the average confidence of the confidence corresponding to the same audio type is the highest, the same audio type can be decided by the corresponding class estimation, and wherein the output confidence is the current confidence or an weighted or un-weighted average of the confidence of the class estimation which can decide the output audio type, where the earlier confidence has the higher weight than the later confidence.

In further embodiments of system 1500 and method 1600, if the classification algorithm adopted by one of the classifier stages and the sub-steps in the chain has higher accuracy in classifying at least one of the audio types, the classifier stage and the sub-step is specified with a higher priority level.

In further embodiments of system 1500 and method 1600, each training sample for the classifier in each of the latter classifier stages and sub-step comprises at least an audio sample marked with the correct audio type, audio types to be identified by the classifier, and statistics on the confidence corresponding to each of the audio types, which is generated by all the earlier classifier stages based on the audio sample.

In further embodiments of system 1500 and method 1600, training samples for the classifier in each of the latter classifier stages and sub-steps comprises at least audio sample marked with the correct audio type but miss-classified or classified with low confidence by all the earlier classifier stages.

Figure 17:
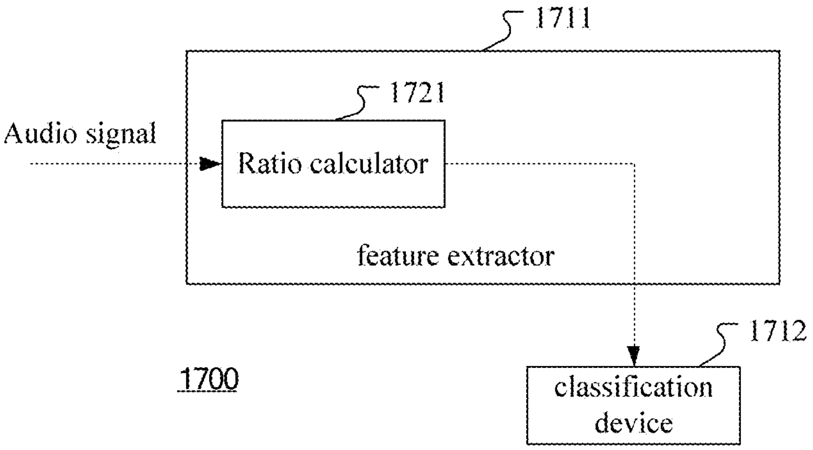
FIG. 17 is a block diagram illustrating an example audio classification system according to an embodiment of the invention.

FIG. 17 is a block diagram illustrating an example audio classification system 1700 according to an embodiment of the invention.

As illustrated in FIG. 17, audio classification system 1700 includes a feature extractor 1711 for extracting audio features from segments of the audio signal, and a classification device 1712 for classifying the segments with a trained model based on the extracted audio features. Feature extractor 1711 includes a ratio calculator 1721. Ratio calculator 1721 calculates a spectrum-bin high energy ratio for each of the segments as the audio feature. The spectrum-bin high energy ratio is the ratio between the number of frequency bins with energy higher than a threshold and the total number of frequency bins in the spectrum of the segment.

Figure 18:
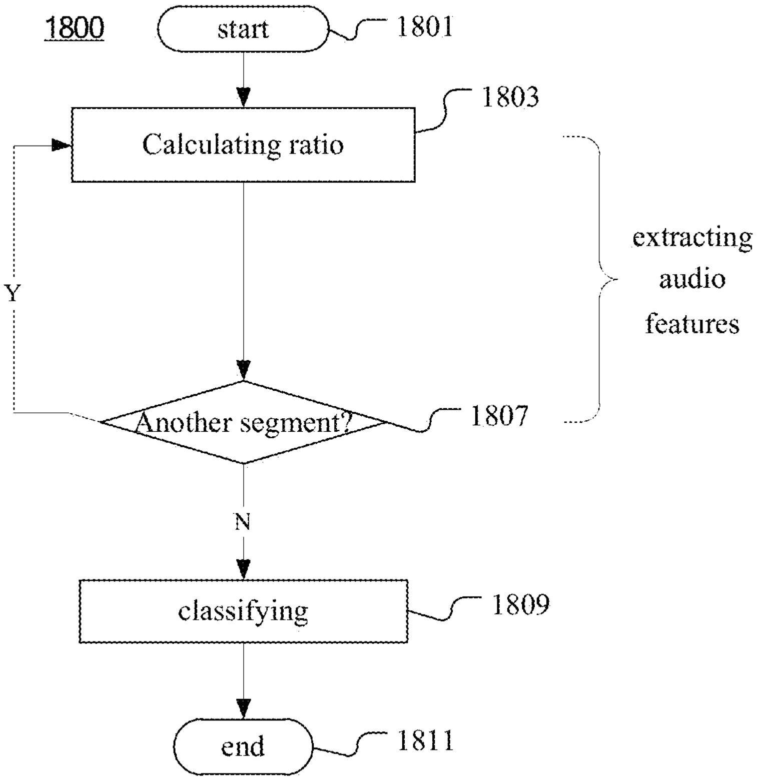
FIG. 18 is a flow chart illustrating an example audio classification method according to an embodiment of the present invention.

FIG. 18 is a flow chart illustrating an example audio classification method 1800 according to an embodiment of the present invention.

As illustrated in FIG. 18, audio classification method 1800 starts from step 1801. Steps 1803 and 1807 are executed to extract audio features from segments of the audio signal.

At step 1803, a spectrum-bin high energy ratio is calculated for each of the segments as the audio feature. The spectrum-bin high energy ratio is the ratio between the number of frequency bins with energy higher than a threshold and the total number of frequency bins in the spectrum of the segment.

At step 1807, it is determined whether there is another segment not processed yet. If yes, method 1800 returns to step 1803. If no, method 1800 proceeds to step 1809.

At step 1809, the segments are classified with a trained model based on the extracted audio features.

Method 1800 ends at step 1811.

In some cases where the complexity is strictly limited, the residual analysis described above can be replaced by a feature called spectrum-bin high energy ratio. The spectrum-bin high energy ratio feature is intended to approximate the performance of the residual of frequency decomposition. The threshold may be determined so that the performance approximates the performance of the residual of frequency decomposition.

In an example, the threshold may be calculated as one of the following:

1) an average energy of the spectrum of the segment or a segment range around the segment;

2) a weighted average energy of the spectrum of the segment or a segment range around the segment, where the segment has a relatively higher weight, and each other segment in the range has a relatively lower weight, or where each frequency bin of relatively higher energy has a relatively higher weight, and each frequency bin of relatively lower energy has a relatively lower weight;

3) a scaled value of the average energy or the weighted average energy; and 4) the average energy or the weighted average energy plus or minus a standard deviation.

Figure 19:
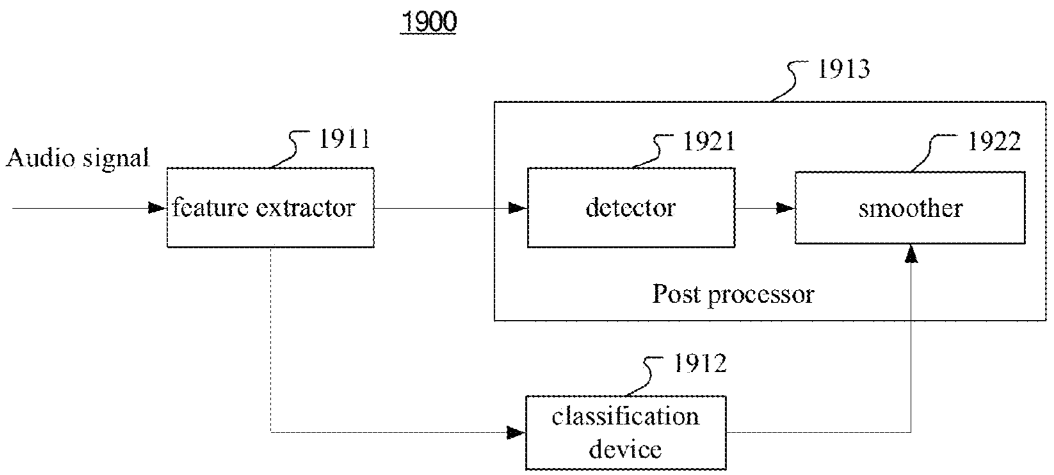
FIG. 19 is a block diagram illustrating an example audio classification system according to an embodiment of the invention.

FIG. 19 is a block diagram illustrating an example audio classification system 1900 according to an embodiment of the invention.

As illustrated in FIG. 19, audio classification system 1900 includes a feature extractor 1911 for extracting audio features from segments of the audio signal, a classification device 1912 for classifying the segments with a trained model based on the extracted audio features, and a post processor 1913 for smoothing the audio types of the segments. Post processor 1913 includes a detector 1921 and a smoother 1922.

Detector 1921 searches for two repetitive sections in the audio signal. Smoother 1922 smoothes the classification result by regarding the segments between the two repetitive sections as non-speech type.

Figure 20:
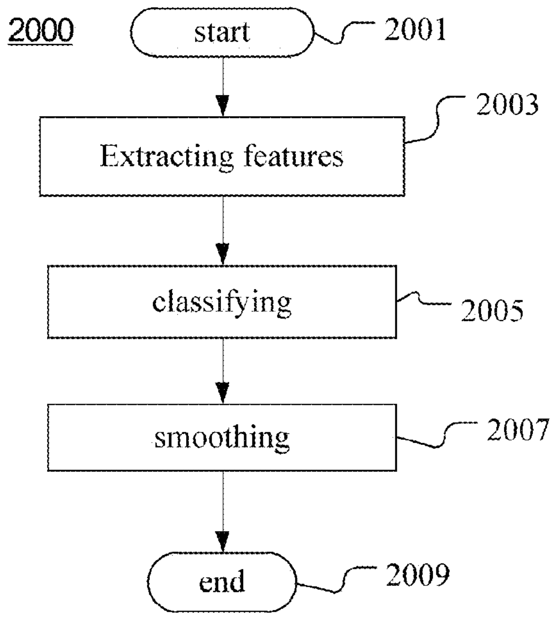
FIG. 20 is a flow chart illustrating an example audio classification method according to an embodiment of the present invention.

FIG. 20 is a flow chart illustrating an example audio classification method 2000 according to an embodiment of the present invention.

As illustrated in FIG. 20, audio classification method 2000 starts from step 2001. At step 2003, audio features are extracted from segments of the audio signal.

At step 2005, the segments are classified with a trained model based on the extracted audio features.

At step 2007, the audio types of the segments are smoothed. Specifically, step 2007 includes a sub-step of searching for two repetitive sections in the audio signal, and a sub-step of smoothing the classification result by regarding the segments between the two repetitive sections as non-speech type.

Method 2000 ends at step 2011.

Since repeating pattern can hardly be found between speech signal sections, it can be assumed that if a pair of repetitive sections is identified, the signal segment between this pair of repetitive sections is non-speech. Hence, any classification results of speech in this signal segment can be considered as miss-classification and revised. For example, considering a piece of rap music with a large number of miss-classifications (as speech), if the repeating pattern search discovers a pair of repetitive sections (possibly the chorus of this rap music) located near the start and end of the music respectively, all classification results between these two sections can be revised to music so that the classification error rate is reduced significantly.

Further, as the classification result, class estimation for each of the segments in the audio signal may be generated through the classifying. Each of the class estimation may include an estimated audio type and corresponding confidence. In this case, the smoothing may be performed according to one of the following criteria:

1) applying smoothing only on the audio types with low confidence, so that actual sudden change in the signal can avoid being smoothed;
2) applying smoothing between the repetitive sections if the degree of similarity between the repetitive sections is higher than a threshold, so that it can be believed that the input signal is music, or if there is plenty of 'music' decision between the repetitive sections, for example, more than 50% of the existing segments are classified as music, or more than 100 segments are classified as music, or the number of segments classified as music is more than the number of the segments classified as speech;
3) applying smoothing between the repetitive sections only if the segments classified as the audio type of music are in the majority of all the segments between the repetitive sections,
4) applying smoothing between the repetitive sections only if the collective confidence or average confidence of the segments classified as the audio type of music between the repetitive sections is higher than the collective confidence or average confidence of the segments classified as the audio type other than music between the repetitive sections, or higher than another threshold.

Figure 21:
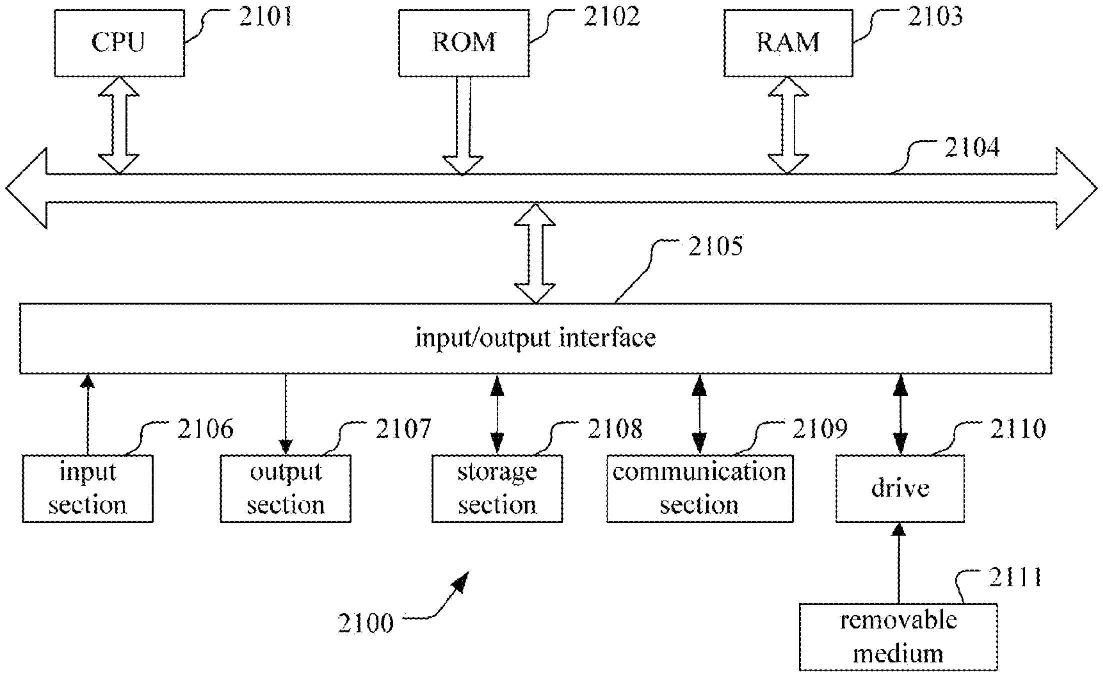
FIG. 21 is a block diagram illustrating an exemplary system for implementing embodiments of the present invention.

FIG. 21 is a block diagram illustrating an exemplary system for implementing the aspects of the present invention.

In FIG. 21, a central processing unit (CPU) 2101 performs various processes in accordance with a program stored in a read only memory (ROM) 2102 or a program loaded from a storage section 2108 to a random access memory (RAM) 2103. In the RAM 2103, data required when the CPU 2101 performs the various processes or the like is also stored as required.

The CPU 2101, the ROM 2102 and the RAM 2103 are connected to one another via a bus 2104. An input/output interface 2105 is also connected to the bus 2104.

The following components are connected to the input/output interface 2105: an input section 2106 including a keyboard, a mouse, or the like; an output section 2107 including a display such as a cathode ray tube (CRT), a liquid crystal display (LCD), or the like, and a loudspeaker or the like; the storage section 2108 including a hard disk or the like; and a communication section 2109 including a network interface card such as a LAN card, a modem, or the like. The communication section 2109 performs a communication process via the network such as the internet.

A drive 2110 is also connected to the input/output interface 2105 as required. A removable medium 2111, such as a magnetic disk, an optical disk, a magneto-optical disk, a semiconductor memory, or the like, is mounted on the drive 2110 as required, so that a computer program read therefrom is installed into the storage section 2108 as required.

In the case where the above-described steps and processes are implemented by the software, the program that constitutes the software is installed from the network such as the internet or the storage medium such as the removable medium 2111.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The following exemplary embodiments (each an "EE") are described.

EE 1. An audio classification system comprising:

at least one device operable in at least two modes requiring different resources; and a complexity controller which determines a combination and instructs the at least one device to operate according to the combination, wherein for each of the at least one device, the combination specifies one of the modes of the device, and the resources requirement of the combination does not exceed maximum available resources, wherein the at least one device comprises at least one of the following:

a pre-processor for adapting an audio signal to the audio classification system;

a feature extractor for extracting audio features from segments of the audio signal;

a classification device for classifying the segments with a trained model based on the extracted audio features; and a post processor for smoothing the audio types of the segments.

EE 2. The audio classification system according to EE 1, wherein the at least two modes of the pre-processor include a mode where the sampling rate of the audio signal is converted with filtering and another mode where the sampling rate of the audio signal is converted without filtering.

EE 3. The audio classification system according to EE 1 or 2, wherein audio features for the audio classification can be divided into a first type not suitable to pre-emphasis and a second type suitable to pre-emphasis, and wherein at least two modes of the pre-processor include a mode where the audio signal is directly pre-emphasized, and the audio signal and the pre-emphasized audio signal are transformed into frequency domain, and another mode where the audio signal is transformed into frequency domain, and the transformed audio signal is pre-emphasized, and wherein the audio features of the first type are extracted from the transformed audio signal not being pre-emphasized, and the audio features of the second type are extracted from the transformed audio signal being pre-emphasized.

EE 4. The audio classification system according to EE 3, wherein the first type includes at least one of sub-band energy distribution, residual of frequency decomposition, zero crossing rate, spectrum-bin high energy ratio, bass indicator and long-term auto-correlation feature, and the second type includes at least one of spectrum fluctuation and mel-frequency cepstral coefficients.

EE 5. The audio classification system according to EE 1, wherein the feature extractor is configured to:

calculate long-term auto-correlation coefficients of the segments longer than a first threshold in the audio signal based on the Wiener-Khinchin theorem, and calculate at least one item of statistics on the long-term auto-correlation coefficients for the audio classification, wherein the at least two modes of the feature extractor include a mode where the long-term auto-correlation coefficients are directly calculated from the segments, and another mode where the segments are decimated and the long-term auto-correlation coefficients are calculated from the decimated segments.

EE 6. The audio classification system according to EE 5, wherein the statistics include at least one of the following items:

1) mean: an average of all the long-term auto-correlation coefficients;

2) variance: a standard deviation value of all the long-term auto-correlation coefficients;

3) High_Average: an average of the long-term auto-correlation coefficients that satisfy at least one of the following conditions:

a) greater than a second threshold; and b) within a predetermined proportion of long-term auto-correlation coefficients not lower than all the other long-term auto-correlation coefficients;

4) High_Value_Percentage: a ratio between the number of the long-term auto-correlation coefficients involved in High_Average and the total number of long-term auto-correlation coefficients;

5) Low_Average: an average of the long-term auto-correlation coefficients that satisfy at least one of the following conditions:

c) smaller than a third threshold; and d) within a predetermined proportion of long-term auto-correlation coefficients not higher than all the other long-term auto-correlation coefficients;

6) Low_Value_Percentage: a ratio between the number of the long-term auto-correlation coefficients involved in Low_Average and the total number of long-term auto-correlation coefficients; and 7) Contrast: a ratio between High_Average and Low_Average.

EE 7. The audio classification system according to EE 1 or 2, wherein audio features for the audio classification include a bass indicator feature obtained by applying zero crossing rate on each of the segments filtered through a low-pass filter where low-frequency percussive components are permitted to pass.

EE 8. The audio classification system according to EE 1, wherein the feature extractor is configured to:

for each of the segments, calculate residuals of frequency decomposition of at least level 1, level 2 and level 3 respectively by removing at least a first energy, a second energy and a third energy respectively from total energy E on a spectrum of each of frames in the segment; and for each of the segments, calculate at least one item of statistics on the residuals of a same level for the frames in the segment, wherein the calculated residuals and statistics are included in the audio features, and wherein the at least two modes of the feature extractor include a mode where the first energy is a total energy of highest $H_1$ frequency bins of the spectrum, the second energy is a total energy of highest $H_2$ frequency bins of the spectrum, and the third energy is a total energy of highest $H_3$ frequency bins of the spectrum, where $H_1<H_2<H_3$, and another mode where the first energy is a total energy of one or more peak areas of the spectrum, the second energy is a total energy of one or more peak areas of the spectrum, a portion of which includes the peak areas involved in the first energy, and the third energy is a total energy of one or more peak areas of the spectrum, a portion of which includes the peak areas involved in the second energy.

EE 9. The audio classification system according to EE 8, wherein the statistics include at least one of the following items:

1) a mean of the residuals of the same level for the frames in the same segment;

2) variance: a standard deviation of the residuals of the same level for the frames in the same segment;

3) Residual_High_Average: an average of the residuals of the same level for the frames in the same segment, which satisfy at least one of the following conditions:

a) greater than a fourth threshold; and b) within a predetermined proportion of residuals not lower than all the other residuals;

4) Residual_Low_Average: an average of the residuals of the same level for the frames in the same segment, which satisfy at least one of the following conditions:

c) smaller than a fifth threshold; and d) within a predetermined proportion of residuals not higher than all the other residuals; and 5) Residual_Contrast: a ratio between Residual_High_Average and Residual_Low_Average.

EE 10. The audio classification system according to EE 1 or 2, wherein audio features for the audio classification include a spectrum-bin high energy ratio which is a ratio between the number of frequency bins with energy higher than a sixth threshold and the total number of frequency bins in the spectrum of each of the segments.

EE 11. The audio classification system according to EE 10, wherein the sixth threshold is calculated as one of the following:

1) an average energy of the spectrum of the segment or a segment range around the segment;

2) a weighted average energy of the spectrum of the segment or a segment range around the segment, where the segment has a relatively higher weight, and each other segment in the range has a relatively lower weight, or where each frequency bin of relatively higher energy has a relatively higher weight, and each frequency bin of relatively lower energy has a relatively lower weight;

3) a scaled value of the average energy or the weighted average energy; and 4) the average energy or the weighted average energy plus or minus a standard deviation.

EE 12. The audio classification system according to EE 1, wherein the classification device comprises:

a chain of at least two classifier stages with different priority levels, which are arranged in descending order of the priority levels; and a stage controller which determines a sub-chain starting from the classifier stage with the highest priority level, wherein the length of the sub-chain depends on the mode in the combination for the classification device, wherein each of the classifier stages comprises:

a classifier which generates current class estimation based on the corresponding audio features extracted from each of the segments, wherein the current class estimation includes an estimated audio type and corresponding confidence; and a decision unit which 1) if the classifier stage is located at the start of the sub-chain, determines whether the current confidence is higher than a confidence threshold associated with the classifier stage; and if it is determined that the current confidence is higher than the confidence threshold, terminates the audio classification by outputting the current class estimation, and if otherwise, provides the current class estimation to all the later classifier stages in the sub-chain, 2) if the classifier stage is located in the middle of the sub-chain, determines whether the current confidence is higher than the confidence threshold, or whether the current class estimation and all the earlier class estimation can decide an audio type according to a first decision criterion; and if it is determined that the current confidence is higher than the confidence threshold, or the class estimation can decide an audio type, terminates the audio classification by outputting the current class estimation, or outputting the decided audio type and the corresponding confidence, and if otherwise, provides the current class estimation to all the later classifier stages in the sub-chain, and 3) if the classifier stage is located at the end of the sub-chain, terminates the audio classification by outputting the current class estimation, or determines whether the current class estimation and all the earlier class estimation can decide an audio type according to a second decision criterion; and if it is determined that the class estimation can decide an audio type, terminates the audio classification by outputting the decided audio type and the corresponding confidence, and if otherwise, terminates the audio classification by outputting the current class estimation.

EE 13. The audio classification system according to EE 12, wherein the first decision criterion comprises one of the following criteria:

1) if an average confidence of the current confidence and the earlier confidence corresponding to the same audio type as the current audio type is higher than a seventh threshold, the current audio type can be decided;
2) if a weighted average confidence of the current confidence and the earlier confidence corresponding to the same audio type as the current audio type is higher than an eighth threshold, the current audio type can be decided; and
3) if the number of the earlier classifier stages deciding the same audio type as the current audio type is higher than a ninth threshold, the current audio type can be decided, and wherein the output confidence is the current confidence or an weighted or un-weighted average of the confidence of the class estimation which can decide the output audio type, where the earlier confidence has the higher weight than the later confidence.

EE 14. The audio classification system according to EE 12, wherein the second decision criterion comprises one of the following criteria:

1) among all the class estimation, if the number of the class estimation including the same audio type is the highest, the same audio type can be decided by the corresponding class estimation;
2) among all the class estimation, if the weighted number of the class estimation including the same audio type is the highest, the same audio type can be decided by the corresponding class estimation; and
3) among all the class estimation, if the average confidence of the confidence corresponding to the same audio type is the highest, the same audio type can be decided by the corresponding class estimation, and wherein the output confidence is the current confidence or an weighted or un-weighted average of the confidence of the class estimation which can decide the output audio type, where the earlier confidence has the higher weight than the later confidence.

EE 15. The audio classification system according to EE 12, wherein if the classification algorithm adopted by one of the classifier stages has higher accuracy in classifying at least one of the audio types, the classifier stages is specified with a higher priority level.

EE 16. The audio classification system according to EE 12 or 15, wherein each training sample for the classifier in each of the latter classifier stages comprises at least an audio sample marked with the correct audio type, audio types to be identified by the classifier, and statistics on the confidence corresponding to each of the audio types, which is generated by all the earlier classifier stages based on the audio sample.

EE 17. The audio classification system according to EE 12 or 15, wherein training samples for the classifier in each of the latter classifier stages comprises at least audio sample marked with the correct audio type but miss-classified or classified with low confidence by all the earlier classifier stages.

EE 18. The audio classification system according to EE 1, wherein class estimation is generated for each of the segments in the audio signal through the audio classification, where each of the class estimation includes an estimated audio type and corresponding confidence, and wherein the at least two modes of the post processor include a mode where the highest sum or average of the confidence corresponding to the same audio type in the window is determined, and the current audio type is replaced with the same audio type, and another mode where the window with a relatively shorter length is adopted, and/or the highest number of the confidence corresponding to the same audio type in the window is determined, and the current audio type is replaced with the same audio type.

EE 19. The audio classification system according to EE 1, wherein the post processor is configured to search for two repetitive sections in the audio signal, and smooth the classification result by regarding the segments between the two repetitive sections as non-speech type, and wherein the at least two modes of the post processor include a mode where a relatively longer searching range is adopted, and another mode where a relatively shorter searching range is adopted.

EE 20. An audio classification method comprising:

at least one step which can be executed in at least two modes requiring different resources;

determining a combination; and instructing to execute the at least one step according to the combination, wherein for each of the at least one step, the combination specifies one of the modes of the step, and the resources requirement of the combination does not exceed maximum available resources, wherein the at least one step comprises at least one of the following:

a pre-processing step of adapting an audio signal to the audio classification;

a feature extracting step of extracting audio features from segments of the audio signal;

a classifying step of classifying the segments with a trained model based on the extracted audio features; and a post processing step of smoothing the audio types of the segments.

EE 21. The audio classification method according to EE 20, wherein the at least two modes of the pre-processor include a mode where the sampling rate of the audio signal is converted with filtering and another mode where the sampling rate of the audio signal is converted without filtering.

EE 22. The audio classification method according to EE 20 or 21, wherein audio features for the audio classification can be divided into a first type not suitable to pre-emphasis and a second type suitable to pre-emphasis, and wherein at least two modes of the pre-processing step include a mode where the audio signal is directly pre-emphasized, and the audio signal and the pre-emphasized audio signal are transformed into frequency domain, and another mode where the audio signal is transformed into frequency domain, and the transformed audio signal is pre-emphasized, and wherein the audio features of the first type are extracted from the transformed audio signal not being pre-emphasized, and the audio features of the second type are extracted from the transformed audio signal being pre-emphasized.

EE 23. The audio classification method according to EE 22, wherein the first type includes at least one of sub-band energy distribution, residual of frequency decomposition, zero crossing rate, spectrum-bin high energy ratio, bass indicator and long-term auto-correlation feature, and the second type includes at least one of spectrum fluctuation and mel-frequency cepstral coefficients.

EE 24. The audio classification method according to EE 20, wherein the feature extracting step comprises:

calculating long-term auto-correlation coefficients of the segments longer than a first threshold in the audio signal based on the Wiener-Khinchin theorem, and calculating at least one item of statistics on the long-term auto-correlation coefficients for the audio classification, wherein the at least two modes of the feature extracting step include a mode where the long-term auto-correlation coefficients are directly calculated from the segments, and another mode where the segments are decimated and the long-term auto-correlation coefficients are calculated from the decimated segments.

EE 25. The audio classification method according to EE 24, wherein the statistics include at least one of the following items:

1) mean: an average of all the long-term auto-correlation coefficients;

2) variance: a standard deviation value of all the long-term auto-correlation coefficients;

3) High_Average: an average of the long-term auto-correlation coefficients that satisfy at least one of the following conditions:

a) greater than a second threshold; and b) within a predetermined proportion of long-term auto-correlation coefficients not lower than all the other long-term auto-correlation coefficients;

4) High_Value_Percentage: a ratio between the number of the long-term auto-correlation coefficients involved in High_Average and the total number of long-term auto-correlation coefficients;

5) Low_Average: an average of the long-term auto-correlation coefficients that satisfy at least one of the following conditions:

c) smaller than a third threshold; and d) within a predetermined proportion of long-term auto-correlation coefficients not higher than all the other long-term auto-correlation coefficients;

6) Low_Value_Percentage: a ratio between the number of the long-term auto-correlation coefficients involved in Low_Average and the total number of long-term auto-correlation coefficients; and 7) Contrast: a ratio between High_Average and Low_Average.

EE 26. The audio classification method according to EE 20 or 21, wherein audio features for the audio classification include a bass indicator feature obtained by applying zero crossing rate on each of the segments filtered through a low-pass filter where low-frequency percussive components are permitted to pass.

EE 27. The audio classification method according to EE 20, wherein the feature extracting step comprises:

for each of the segments, calculating residuals of frequency decomposition of at least level 1, level 2 and level 3 respectively by removing at least a first energy, a second energy and a third energy respectively from total energy E on a spectrum of each of frames in the segment; and for each of the segments, calculating at least one item of statistics on the residuals of a same level for the frames in the segment, wherein the calculated residuals and statistics are included in the audio features, and wherein the at least two modes of the feature extracting step include a mode where the first energy is a total energy of highest $H_1$ frequency bins of the spectrum, the second energy is a total energy of highest $H_2$ frequency bins of the spectrum, and the third energy is a total energy of highest $H_3$ frequency bins of the spectrum, where $H_1<H_2<H_3$, and another mode where the first energy is a total energy of one or more peak areas of the spectrum, the second energy is a total energy of one or more peak areas of the spectrum, a portion of which includes the peak areas involved in the first energy, and the third energy is a total energy of one or more peak areas of the spectrum, a portion of which includes the peak areas involved in the second energy.

EE 28. The audio classification method according to EE 27, wherein the statistics include at least one of the following items:

1) a mean of the residuals of the same level for the frames in the same segment;

2) variance: a standard deviation of the residuals of the same level for the frames in the same segment;

3) Residual_High_Average: an average of the residuals of the same level for the frames in the same segment, which satisfy at least one of the following conditions:

a) greater than a fourth threshold; and b) within a predetermined proportion of residuals not lower than all the other residuals;

4) Residual_Low_Average: an average of the residuals of the same level for the frames in the same segment, which satisfy at least one of the following conditions:

c) smaller than a fifth threshold; and d) within a predetermined proportion of residuals not higher than all the other residuals; and 5) Residual_Contrast: a ratio between Residual_High_Average and Residual_Low_Average.

EE 29. The audio classification method according to EE 21 or 22, wherein audio features for the audio classification include a spectrum-bin high energy ratio which is a ratio between the number of frequency bins with energy higher than a sixth threshold and the total number of frequency bins in the spectrum of each of the segments.

EE 30. The audio classification method according to EE 29, wherein the sixth threshold is calculated as one of the following:

1) an average energy of the spectrum of the segment or a segment range around the segment;

2) a weighted average energy of the spectrum of the segment or a segment range around the segment, where the segment has a relatively higher weight, and each other segment in the range has a relatively lower weight, or where each frequency bin of relatively higher energy has a relatively higher weight, and each frequency bin of relatively lower energy has a relatively lower weight;

3) a scaled value of the average energy or the weighted average energy; and 4) the average energy or the weighted average energy plus or minus a standard deviation.

EE 31. The audio classification method according to EE 20, wherein the classifying step comprises:

a chain of at least two sub-steps with different priority levels, which are arranged in descending order of the priority levels; and a controlling step of determining a sub-chain starting from the sub-step with the highest priority level, wherein the length of the sub-chain depends on the mode in the combination for the classifying step, wherein each of the sub-steps comprises:

generating current class estimation based on the corresponding audio features extracted from each of the segments, wherein the current class estimation includes an estimated audio type and corresponding confidence;

if the sub-step is located at the start of the sub-chain, determining whether the current confidence is higher than a confidence threshold associated with the sub-step; and if it is determined that the current confidence is higher than the confidence threshold, terminating the audio classification by outputting the current class estimation, and if otherwise, providing the current class estimation to all the later sub-steps in the sub-chain, if the sub-step is located in the middle of the sub-chain, determining whether the current confidence is higher than the confidence threshold, or whether the current class estimation and all the earlier class estimation can decide an audio type according to a first decision criterion; and if it is determined that the current confidence is higher than the confidence threshold, or the class estimation can decide an audio type, terminating the audio classification by outputting the current class estimation, or outputting the decided audio type and the corresponding confidence, and if otherwise, providing the current class estimation to all the later sub-steps in the sub-chain, and if the sub-step is located at the end of the sub-chain, terminating the audio classification by outputting the current class estimation, or determining whether the current class estimation and all the earlier class estimation can decide an audio type according to a second decision criterion; and if it is determined that the class estimation can decide an audio type, terminating the audio classification by outputting the decided audio type and the corresponding confidence, and if otherwise, terminating the audio classification by outputting the current class estimation.

EE 32. The audio classification method according to EE 31, wherein the first decision criterion comprises one of the following criteria:

1) if an average confidence of the current confidence and the earlier confidence corresponding to the same audio type as the current audio type is higher than a seventh threshold, the current audio type can be decided;

2) if a weighted average confidence of the current confidence and the earlier confidence corresponding to the same audio type as the current audio type is higher than an eighth threshold, the current audio type can be decided; and 3) if the number of the earlier sub-steps deciding the same audio type as the current audio type is higher than a ninth threshold, the current audio type can be decided, and wherein the output confidence is the current confidence or an weighted or un-weighted average of the confidence of the class estimation which can decide the output audio type, where the earlier confidence has the higher weight than the later confidence.

EE 33. The audio classification method according to EE 31, wherein the second decision criterion comprises one of the following criteria:

1) among all the class estimation, if the number of the class estimation including the same audio type is the highest, the same audio type can be decided by the corresponding class estimation;

2) among all the class estimation, if the weighted number of the class estimation including the same audio type is the highest, the same audio type can be decided by the corresponding class estimation; and 3) among all the class estimation, if the average confidence of the confidence corresponding to the same audio type is the highest, the same audio type can be decided by the corresponding class estimation, and wherein the output confidence is the current confidence or an weighted or un-weighted average of the confidence of the class estimation which can decide the output audio type, where the earlier confidence has the higher weight than the later confidence.

EE 34. The audio classification method according to EE 31, wherein if the classification algorithm adopted by one of the sub-steps has higher accuracy in classifying at least one of the audio types, the sub-steps is specified with a higher priority level.

EE 35. The audio classification method according to EE 31 or 34, wherein each training sample for the classifier in each of the latter sub-steps comprises at least an audio sample marked with the correct audio type, audio types to be identified by the classifier, and statistics on the confidence corresponding to each of the audio types, which is generated by all the earlier sub-steps based on the audio sample.

EE 36. The audio classification method according to EE 31 or 34, wherein training samples for the classifier in each of the latter sub-steps comprises at least audio sample marked with the correct audio type but miss-classified or classified with low confidence by all the earlier sub-steps.

EE 37. The audio classification method according to EE 20, wherein class estimation is generated for each of the segments in the audio signal through the audio classification, where each of the class estimation includes an estimated audio type and corresponding confidence, and wherein the at least two modes of the post processing step include a mode where the highest sum or average of the confidence corresponding to the same audio type in the window is determined, and the current audio type is replaced with the same audio type, and another mode where the window with a relatively shorter length is adopted, and/or the highest number of the confidence corresponding to the same audio type in the window is determined, and the current audio type is replaced with the same audio type.

EE 38. The audio classification method according to EE 20, wherein the post processing step comprises searching for two repetitive sections in the audio signal, and smoothing the classification result by regarding the segments between the two repetitive sections as non-speech type, and wherein the at least two modes of the post processing step include a mode where a relatively longer searching range is adopted, and another mode where a relatively shorter searching range is adopted.

EE 39. An audio classification system comprising:

a feature extractor for extracting audio features from segments of the audio signal, wherein the feature extractor comprises:

a coefficient calculator which calculates long-term auto-correlation coefficients of the segments longer than a threshold in the audio signal based on the Wiener-Khinchin theorem, as the audio features, and a statistics calculator which calculates at least one item of statistics on the long-term auto-correlation coefficients for the audio classification, as the audio features, and a classification device for classifying the segments with a trained model based on the extracted audio features.

EE 40. The audio classification system according to EE 39, wherein the statistics include at least one of the following items:

1) mean: an average of all the long-term auto-correlation coefficients;
2) variance: a standard deviation value of all the long-term auto-correlation coefficients;
3) High_Average: an average of the long-term auto-correlation coefficients that satisfy at least one of the following conditions:
   a) greater than a second threshold; and
   b) within a predetermined proportion of long-term auto-correlation coefficients not lower than all the other long-term auto-correlation coefficients;
4) High_Value_Percentage: a ratio between the number of the long-term auto-correlation coefficients involved in High_Average and the total number of long-term auto-correlation coefficients;
5) Low_Average: an average of the long-term auto-correlation coefficients that satisfy at least one of the following conditions:
   c) smaller than a third threshold; and
   d) within a predetermined proportion of long-term auto-correlation coefficients not higher than all the other long-term auto-correlation coefficients;
6) Low_Value_Percentage: a ratio between the number of the long-term auto-correlation coefficients involved in Low_Average and the total number of long-term auto-correlation coefficients; and
7) Contrast: a ratio between High_Average and Low_Average.

EE 41. An audio classification method comprising:

extracting audio features from segments of the audio signal, comprising:

calculating long-term auto-correlation coefficients of the segments longer than a threshold in the audio signal based on the Wiener-Khinchin theorem, as the audio features, and calculating at least one item of statistics on the long-term auto-correlation coefficients for the audio classification, as the audio features, and classifying the segments with a trained model based on the extracted audio features.

EE 42. The audio classification method according to EE 41, wherein the statistics include at least one of the following items:

1) mean: an average of all the long-term auto-correlation coefficients;
2) variance: a standard deviation value of all the long-term auto-correlation coefficients;
3) High_Average: an average of the long-term auto-correlation coefficients that satisfy at least one of the following conditions:
   a) greater than a second threshold; and
   b) within a predetermined proportion of long-term auto-correlation coefficients not lower than all the other long-term auto-correlation coefficients;
4) High_Value_Percentage: a ratio between the number of the long-term auto-correlation coefficients involved in High_Average and the total number of long-term auto-correlation coefficients;
5) Low_Average: an average of the long-term auto-correlation coefficients that satisfy at least one of the following conditions:
   c) smaller than a third threshold; and
   d) within a predetermined proportion of long-term auto-correlation coefficients not higher than all the other long-term auto-correlation coefficients;
6) Low_Value_Percentage: a ratio between the number of the long-term auto-correlation coefficients involved in Low_Average and the total number of long-term auto-correlation coefficients; and
7) Contrast: a ratio between High_Average and Low_Average.

EE 43. An audio classification system comprising:

a feature extractor for extracting audio features from segments of the audio signal; and a classification device for classifying the segments with a trained model based on the extracted audio features, and wherein the feature extractor comprises:

a low-pass filter for filtering the segments, where low-frequency percussive components are permitted to pass, and a calculator for extracting bass indicator feature by applying zero crossing rate on each of the segments, as the audio feature.

EE 44. An audio classification method comprising:

extracting audio features from segments of the audio signal; and classifying the segments with a trained model based on the extracted audio features, and wherein the extracting comprises:

filtering the segments through a low-pass filter where low-frequency percussive components are permitted to pass, and extracting a bass indicator feature by applying zero crossing rate on each of the segments, as the audio feature.

EE 45. An audio classification system comprising:

a feature extractor for extracting audio features from segments of the audio signal; and a classification device for classifying the segments with a trained model based on the extracted audio features, and wherein the feature extractor comprises:

a residual calculator which, for each of the segments, calculates residuals of frequency decomposition of at least level 1, level 2 and level 3 respectively by removing at least a first energy, a second energy and a third energy respectively from total energy E on a spectrum of each of frames in the segment; and a statistics calculator which, for each of the segments, calculates at least one item of statistics on the residuals of a same level for the frames in the segment, wherein the calculated residuals and statistics are included in the audio features.

EE 46. The audio classification system according to EE 45, wherein the first energy is a total energy of highest $H_1$ frequency bins of the spectrum, the second energy is a total energy of highest $H_2$ frequency bins of the spectrum, and the third energy is a total energy of highest $H_3$ frequency bins of the spectrum, where $H_1<H_2<H_3$.

EE 47. The audio classification system according to EE 45, wherein the first energy is a total energy of one or more peak areas of the spectrum, the second energy is a total energy of one or more peak areas of the spectrum, a portion of which includes the peak areas involved in the first energy, and the third energy is a total energy of one or more peak areas of the spectrum, a portion of which includes the peak areas involved in the second energy.

EE 48. The audio classification system according to EE 45, wherein the statistics include at least one of the following items:

1) a mean of the residuals of the same level for the frames in the same segment;
2) variance: a standard deviation of the residuals of the same level for the frames in the same segment;

3) Residual_High_Average: an average of the residuals of the same level for the frames in the same segment, which satisfy at least one of the following conditions:
   a) greater than a fourth threshold; and
   b) within a predetermined proportion of residuals not lower than all the other residuals;
4) Residual_Low_Average: an average of the residuals of the same level for the frames in the same segment, which satisfy at least one of the following conditions:
   c) smaller than a fifth threshold; and
   d) within a predetermined proportion of residuals not higher than all the other residuals; and
5) Residual_Contrast: a ratio between Residual_High_Average and Residual_Low_Average.

EE 49. An audio classification method comprising:
extracting audio features from segments of the audio signal; and
classifying the segments with a trained model based on the extracted audio features, and
wherein the extracting comprises:
for each of the segments, calculating residuals of frequency decomposition of at least level 1, level 2 and level 3 respectively by removing at least a first energy, a second energy and a third energy respectively from total energy E on a spectrum of each of frames in the segment; and
for each of the segments, calculating at least one item of statistics on the residuals of a same level for the frames in the segment,
wherein the calculated residuals and statistics are included in the audio features.

50. The audio classification method according to EE 49, wherein the first energy is a total energy of highest $H_1$ frequency bins of the spectrum, the second energy is a total energy of highest $H_2$ frequency bins of the spectrum, and the third energy is a total energy of highest $H_3$ frequency bins of the spectrum, where $H_1<H_2<H_3$.

EE 51. The audio classification method according to EE 49, wherein the first energy is a total energy of one or more peak areas of the spectrum, the second energy is a total energy of one or more peak areas of the spectrum, a portion of which includes the peak areas involved in the first energy, and the third energy is a total energy of one or more peak areas of the spectrum, a portion of which includes the peak areas involved in the second energy.

EE 52. The audio classification method according to EE 49, wherein the statistics include at least one of the following items:
1) a mean of the residuals of the same level for the frames in the same segment;
2) variance: a standard deviation of the residuals of the same level for the frames in the same segment;
3) Residual_High_Average: an average of the residuals of the same level for the frames in the same segment, which satisfy at least one of the following conditions:
   a) greater than a fourth threshold; and
   b) within a predetermined proportion of residuals not lower than all the other residuals;
4) Residual_Low_Average: an average of the residuals of the same level for the frames in the same segment, which satisfy at least one of the following conditions:
   a) smaller than a fifth threshold; and
   b) within a predetermined proportion of residuals not higher than all the other residuals; and
5) Residual_Contrast: a ratio between Residual_High_Average and Residual_Low_Average.

EE 53. An audio classification system comprising:
a feature extractor for extracting audio features from segments of the audio signal; and
a classification device for classifying the segments with a trained model based on the extracted audio features, and
wherein the feature extractor comprises:
a ratio calculator which calculates a spectrum-bin high energy ratio for each of the segments as the audio feature, wherein the spectrum-bin high energy ratio is the ratio between the number of frequency bins with energy higher than a threshold and the total number of frequency bins in the spectrum of the segment.

EE 54. The audio classification system according to EE 53, wherein the feature extractor is configured to determine the threshold as one of the following:
1) an average energy of the spectrum of the segment or a segment range around the segment;
2) a weighted average energy of the spectrum of the segment or a segment range around the segment, where the segment has a relatively higher weight, and each other segment in the range has a relatively lower weight, or where each frequency bin of relatively higher energy has a relatively higher weight, and each frequency bin of relatively lower energy has a relatively lower weight;
3) a scaled value of the average energy or the weighted average energy; and
4) the average energy or the weighted average energy plus or minus a standard deviation.

EE 55. An audio classification method comprising:
extracting audio features from segments of the audio signal; and
classifying the segments with a trained model based on the extracted audio features, and
wherein the extracting comprises:
calculating a spectrum-bin high energy ratio for each of the segments as the audio feature, wherein the spectrum-bin high energy ratio is the ratio between the number of frequency bins with energy higher than a threshold and the total number of frequency bins in the spectrum of the segment.

EE 56. The audio classification method according to EE 55, wherein the extracting comprises determining the threshold as one of the following:
1) an average energy of the spectrum of the segment or a segment range around the segment;
2) a weighted average energy of the spectrum of the segment or a segment range around the segment, where the segment has a relatively higher weight, and each other segment in the range has a relatively lower weight, or where each frequency bin of relatively higher energy has a relatively higher weight, and each frequency bin of relatively lower energy has a relatively lower weight;
3) a scaled value of the average energy or the weighted average energy; and
4) the average energy or the weighted average energy plus or minus a standard deviation.

EE 57. An audio classification system comprising:
a feature extractor for extracting audio features from segments of the audio signal; and
a classification device for classifying the segments with a trained model based on the extracted audio features, and
wherein the classification device comprises:
a chain of at least two classifier stages with different priority levels, which are arranged in descending order of the priority levels, wherein each of the classifier stages comprises:

a classifier which generates current class estimation based on the corresponding audio features extracted from each of the segments, wherein the current class estimation includes an estimated audio type and corresponding confidence; and a decision unit which 1) if the classifier stage is located at the start of the chain, determines whether the current confidence is higher than a confidence threshold associated with the classifier stage; and if it is determined that the current confidence is higher than the confidence threshold, terminates the audio classification by outputting the current class estimation, and if otherwise, provides the current class estimation to all the later classifier stages in the chain, 2) if the classifier stage is located in the middle of the chain, determines whether the current confidence is higher than the confidence threshold, or whether the current class estimation and all the earlier class estimation can decide an audio type according to a first decision criterion; and if it is determined that the current confidence is higher than the confidence threshold, or the class estimation can decide an audio type, terminates the audio classification by outputting the current class estimation, or outputting the decided audio type and the corresponding confidence, and if otherwise, provides the current class estimation to all the later classifier stages in the chain, and 3) if the classifier stage is located at the end of the chain, terminates the audio classification by outputting the current class estimation, or determines whether the current class estimation and all the earlier class estimation can decide an audio type according to a second decision criterion; and if it is determined that the class estimation can decide an audio type, terminates the audio classification by outputting the decided audio type and the corresponding confidence, and if otherwise, terminates the audio classification by outputting the current class estimation.

EE 58. The audio classification system according to EE 57, wherein the first decision criterion comprises one of the following criteria:

1) if an average confidence of the current confidence and the earlier confidence corresponding to the same audio type as the current audio type is higher than a seventh threshold, the current audio type can be decided;

2) if a weighted average confidence of the current confidence and the earlier confidence corresponding to the same audio type as the current audio type is higher than an eighth threshold, the current audio type can be decided; and 3) if the number of the earlier classifier stages deciding the same audio type as the current audio type is higher than a ninth threshold, the current audio type can be decided, and wherein the output confidence is the current confidence or an weighted or un-weighted average of the confidence of the class estimation which can decide the output audio type, where the earlier confidence has the higher weight than the later confidence.

EE 59. The audio classification system according to EE 57, wherein the second decision criterion comprises one of the following criteria:

1) among all the class estimation, if the number of the class estimation including the same audio type is the highest, the same audio type can be decided by the corresponding class estimation;

2) among all the class estimation, if the weighted number of the class estimation including the same audio type is the highest, the same audio type can be decided by the corresponding class estimation; and 3) among all the class estimation, if the average confidence of the confidence corresponding to the same audio type is the highest, the same audio type can be decided by the corresponding class estimation, and wherein the output confidence is the current confidence or an weighted or un-weighted average of the confidence of the class estimation which can decide the output audio type, where the earlier confidence has the higher weight than the later confidence.

EE 60. The audio classification system according to EE 57, wherein if the classification algorithm adopted by one of the classifier stages has higher accuracy in classifying at least one of the audio types, the classifier stages is specified with a higher priority level.

EE 61. The audio classification system according to EE 57 or 60, wherein each training sample for the classifier in each of the latter classifier stages comprises at least an audio sample marked with the correct audio type, audio types to be identified by the classifier, and statistics on the confidence corresponding to each of the audio types, which is generated by all the earlier classifier stages based on the audio sample.

EE 62. The audio classification system according to EE 57 or 60, wherein training samples for the classifier in each of the latter classifier stages comprises at least audio sample marked with the correct audio type but miss-classified or classified with low confidence by all the earlier classifier stages.

EE 63. An audio classification method comprising:

extracting audio features from segments of the audio signal; and classifying the segments with a trained model based on the extracted audio features, and wherein the classifying comprises:

a chain of at least two sub-steps with different priority levels, which are arranged in descending order of the priority levels, and wherein each of the sub-steps comprises:

generating current class estimation based on the corresponding audio features extracted from each of the segments, wherein the current class estimation includes an estimated audio type and corresponding confidence;

if the sub-step is located at the start of the chain, determining whether the current confidence is higher than a confidence threshold associated with the sub-step; and if it is determined that the current confidence is higher than the confidence threshold, terminating the audio classification by outputting the current class estimation, and if otherwise, providing the current class estimation to all the later sub-steps in the chain, if the sub-step is located in the middle of the chain, determining whether the current confidence is higher than the confidence threshold, or whether the current class estimation and all the earlier class estimation can decide an audio type according to a first decision criterion; and if it is determined that the current confidence is higher than the confidence threshold, or the class estimation can decide an audio type, terminating the audio classification by outputting the current class estimation, or outputting the decided audio type and the corresponding confidence, and if otherwise, providing the current class estimation to all the later sub-steps in the chain, and if the sub-step is located at the end of the chain, terminating the audio classification by outputting the current class estimation, or determining whether the current class estimation and all the earlier class estimation can decide an audio type according to a second decision criterion; and if it is determined that the class estimation can decide an audio type, terminating the audio classification by outputting the decided audio type and the corresponding confidence, and if otherwise, terminating the audio classification by outputting the current class estimation.

EE 64. The audio classification method according to EE 63, wherein the first decision criterion comprises one of the following criteria:

1) if an average confidence of the current confidence and the earlier confidence corresponding to the same audio type as the current audio type is higher than a seventh threshold, the current audio type can be decided;

2) if a weighted average confidence of the current confidence and the earlier confidence corresponding to the same audio type as the current audio type is higher than an eighth threshold, the current audio type can be decided; and 3) if the number of the earlier sub-steps deciding the same audio type as the current audio type is higher than a ninth threshold, the current audio type can be decided, and wherein the output confidence is the current confidence or an weighted or un-weighted average of the confidence of the class estimation which can decide the output audio type, where the earlier confidence has the higher weight than the later confidence.

EE 65. The audio classification method according to EE 63, wherein the second decision criterion comprises one of the following criteria:

1) among all the class estimation, if the number of the class estimation including the same audio type is the highest, the same audio type can be decided by the corresponding class estimation;

2) among all the class estimation, if the weighted number of the class estimation including the same audio type is the highest, the same audio type can be decided by the corresponding class estimation; and 3) among all the class estimation, if the average confidence of the confidence corresponding to the same audio type is the highest, the same audio type can be decided by the corresponding class estimation, and wherein the output confidence is the current confidence or an weighted or un-weighted average of the confidence of the class estimation which can decide the output audio type, where the earlier confidence has the higher weight than the later confidence.

EE 66. The audio classification method according to EE 63, wherein if the classification algorithm adopted by one of the sub-steps has higher accuracy in classifying at least one of the audio types, the sub-steps is specified with a higher priority level.

EE 67. The audio classification method according to EE 63 or 66, wherein each training sample for the classifier in each of the latter sub-steps comprises at least an audio sample marked with the correct audio type, audio types to be identified by the classifier, and statistics on the confidence corresponding to each of the audio types, which is generated by all the earlier sub-steps based on the audio sample.

EE 68. The audio classification method according to EE 63 or 66, wherein training samples for the classifier in each of the latter sub-steps comprises at least audio sample marked with the correct audio type but miss-classified or classified with low confidence by all the earlier sub-steps.

EE 69. An audio classification system comprising:

a feature extractor for extracting audio features from segments of the audio signal;

a classification device for classifying the segments with a trained model based on the extracted audio features; and a post processor for smoothing the audio types of the segments, wherein the post processor comprises:

a detector which searches for two repetitive sections in the audio signal, and a smoother which smoothes the classification result by regarding the segments between the two repetitive sections as non-speech type.

EE 70. The audio classification system according to EE 69, wherein the classification device is configured to generate class estimation for each of the segments in the audio signal through the audio classification, where each of the class estimation includes an estimated audio type and corresponding confidence, and wherein the smoother is configured to smooth the classification result according to one of the following criteria:

1) applying smoothing only on the audio types with low confidence, 2) applying smoothing between the repetitive sections if the degree of similarity between the repetitive sections is higher than a threshold, or if there is plenty of 'music' decision between the repetitive sections, 3) applying smoothing between the repetitive sections only if the segments classified as the audio type of music are in the majority of all the segments between the repetitive sections, 4) applying smoothing between the repetitive sections only if the collective confidence or average confidence of the segments classified as the audio type of music between the repetitive sections is higher than the collective confidence or average confidence of the segments classified as the audio type other than music between the repetitive sections, or higher than another threshold.

EE 71. An audio classification method comprising:

extracting audio features from segments of the audio signal;

classifying the segments with a trained model based on the extracted audio features; and smoothing the audio types of the segments, wherein the smoothing comprises:

searching for two repetitive sections in the audio signal, and smoothing the classification result by regarding the segments between the two repetitive sections as non-speech type.

EE 72. The audio classification method according to EE 71, wherein class estimation for each of the segments in the audio signal is generated through the classifying, where each of the class estimation includes an estimated audio type and corresponding confidence, and wherein the smoothing is performed according to one of the following criteria:

1) applying smoothing only on the audio types with low confidence, 2) applying smoothing between the repetitive sections if the degree of similarity between the repetitive sections is higher than a threshold, or if there is plenty of 'music' decision between the repetitive sections, 3) applying smoothing between the repetitive sections only if the segments classified as the audio type of music are in the majority of all the segments between the repetitive sections, 4) applying smoothing between the repetitive sections only if the collective confidence or average confidence of the segments classified as the audio type of music between the repetitive sections is higher than the collective confidence or average confidence of the segments classified as the audio type other than music between the repetitive sections, or higher than another threshold.

EE 73. The audio classification system according to EE 12, wherein the at least one device comprises the feature extractor, the classification device and the post processor, and wherein the feature extractor is configured to:

for each of the segments, calculate residuals of frequency decomposition of at least level 1, level 2 and level 3 respectively by removing at least a first energy, a second energy and a third energy respectively from total energy E on a spectrum of each of frames in the segment; and for each of the segments, calculate at least one item of statistics on the residuals of a same level for the frames in the segment, wherein the calculated residuals and statistics are included in the audio features, and wherein the at least two modes of the feature extractor include a mode where the first energy is a total energy of highest $H_1$ frequency bins of the spectrum, the second energy is a total energy of highest $H_2$ frequency bins of the spectrum, and the third energy is a total energy of highest $H_3$ frequency bins of the spectrum, where $H_1<H_2<H_3$, and another mode where the first energy is a total energy of one or more peak areas of the spectrum, the second energy is a total energy of one or more peak areas of the spectrum, a portion of which includes the peak areas involved in the first energy, and the third energy is a total energy of one or more peak areas of the spectrum, a portion of which includes the peak areas involved in the second energy, and wherein the post processor is configured to search for two repetitive sections in the audio signal, and smooth the classification result by regarding the segments between the two repetitive sections as non-speech type, and wherein the at least two modes of the post processor include a mode where a relatively longer searching range is adopted, and another mode where a relatively shorter searching range is adopted.

EE 74. The audio classification method according to EE 31, wherein the at least one step comprises the feature extracting step, the classifying step and the post processing step, and wherein the feature extracting step comprises:

for each of the segments, calculating residuals of frequency decomposition of at least level 1, level 2 and level 3 respectively by removing at least a first energy, a second energy and a third energy respectively from total energy E on a spectrum of each of frames in the segment; and for each of the segments, calculating at least one item of statistics on the residuals of a same level for the frames in the segment, wherein the calculated residuals and statistics are included in the audio features, and wherein the at least two modes of the feature extracting step include a mode where the first energy is a total energy of highest $H_1$ frequency bins of the spectrum, the second energy is a total energy of highest $H_2$ frequency bins of the spectrum, and the third energy is a total energy of highest $H_3$ frequency bins of the spectrum, where $H_1<H_2<H_3$, and another mode where the first energy is a total energy of one or more peak areas of the spectrum, the second energy is a total energy of one or more peak areas of the spectrum, a portion of which includes the peak areas involved in the first energy, and the third energy is a total energy of one or more peak areas of the spectrum, a portion of which includes the peak areas involved in the second energy, and wherein the post processing step comprises searching for two repetitive sections in the audio signal, and smoothing the classification result by regarding the segments between the two repetitive sections as non-speech type, and wherein the at least two modes of the post processing step include a mode where a relatively longer searching range is adopted, and another mode where a relatively shorter searching range is adopted.

EE 75. A computer-readable medium having computer program instructions recorded thereon, when being executed by a processor, the instructions enabling the processor to execute an audio classification method, comprising:

at least one step which can be executed in at least two modes requiring different resources;

determining a combination; and instructing to execute the at least one step according to the combination, wherein for each of the at least one step, the combination specifies one of the modes of the step, and the resources requirement of the combination does not exceed maximum available resources, wherein the at least one step comprises at least one of the following:

a pre-processing step of adapting an audio signal to the audio classification;

a feature extracting step of extracting audio features from segments of the audio signal;

a classifying step of classifying the segments with a trained model based on the extracted audio features; and a post processing step of smoothing the audio types of the segments.

We claim:

1. An audio classification system comprising:

at least one device operable in at least two modes requiring different resources; and a complexity controller which determines a combination of modes as a result of available resources, and instructs the at least one device to operate according to the combination of modes, wherein for each of the at least one device, the combination of modes specifies one of the modes of the device, where the resources requirement of the combination does not exceed maximum available resources, wherein the at least one device comprises the following:

a pre-processor for adapting an audio signal to the audio classification system;

a feature extractor for extracting audio features from segments of the audio signal;

a classification device for classifying the segments with a trained model based on the extracted audio features; and a post processor for smoothing the audio types of the segments.

2. The audio classification system according to claim 1, wherein at least two modes of the pre-processor include a mode where the sampling rate of the audio signal is converted with filtering and another mode where the sampling rate of the audio signal is converted without filtering.

3. The audio classification system according to claim 1, wherein audio features for the audio classification can be divided into a first type not suitable to pre-emphasis and a second type suitable to pre-emphasis, and wherein at least two modes of the pre-processor include a mode where the audio signal is directly pre-emphasized, where the audio signal and the pre-emphasized audio signal are transformed into frequency domain, and another mode where the audio signal is transformed into frequency domain, where the transformed audio signal is pre-emphasized, and wherein the audio features of the first type are extracted from the transformed audio signal not being pre-emphasized, and the audio features of the second type are extracted from the transformed audio signal being pre-emphasized.

4. The audio classification system according to claim 3, wherein the first type includes at least one of sub-band energy distribution, residual of frequency decomposition, zero crossing rate, spectrum-bin high energy ratio, bass indicator and long-term auto-correlation feature, and the second type includes at least one of spectrum fluctuation and mel-frequency cepstral coefficients.

5. The audio classification system according to claim 1, wherein the feature extractor is configured to:

calculate long-term auto-correlation coefficients of the segments longer than a first threshold in the audio signal based on the Wiener-Khinchin theorem, and calculate at least one item of statistics on the long-term auto-correlation coefficients for the audio classification, wherein at least two modes of the feature extractor include a mode where the long-term auto-correlation coefficients are directly calculated from the segments, and another mode where the segments are decimated and the long-term auto-correlation coefficients are calculated from the decimated segments.

6. The audio classification system according to claim 5, wherein the statistics include at least one of the following items:

1) mean: an average of all the long-term auto-correlation coefficients;

2) variance: a standard deviation value of all the long-term auto-correlation coefficients;

3) High_Average: an average of the long-term auto-correlation coefficients that satisfy at least one of the following conditions:

a) greater than a second threshold; and b) within a predetermined proportion of long-term auto-correlation coefficients not lower than all the other long-term auto-correlation coefficients;

4) High_Value_Percentage: a ratio between the number of the long-term auto-correlation coefficients involved in High_Average and the total number of long-term auto-correlation coefficients;

5) Low_Average: an average of the long-term auto-correlation coefficients that satisfy at least one of the following conditions:

c) smaller than a third threshold; and d) within a predetermined proportion of long-term auto-correlation coefficients not higher than all the other long-term auto-correlation coefficients;

6) Low_Value_Percentage: a ratio between the number of the long-term auto-correlation coefficients involved in Low_Average and the total number of long-term auto-correlation coefficients; and 7) Contrast: a ratio between High_Average and Low_Average.

7. The audio classification system according to claim 1, wherein audio features for the audio classification include a bass indicator feature obtained by applying zero crossing rate on each of the segments filtered through a low-pass filter where low-frequency percussive components are permitted to pass.

8. The audio classification system according to claim 1, wherein the feature extractor is configured to:

for each of the segments, calculate residuals of frequency decomposition of at least level 1, level 2 and level 3 respectively by removing at least a first energy, a second energy and a third energy respectively from total energy E on a spectrum of each of frames in the segment;

and for each of the segments, calculate at least one item of statistics on the residuals of a same level for the frames in the segment, wherein the calculated residuals and statistics are included in the audio features, and wherein at least two modes of the feature extractor include a mode where the first energy is a total energy of highest H1 frequency bins of the spectrum, the second energy is a total energy of highest H2 frequency bins of the spectrum, and the third energy is a total energy of highest H3 frequency bins of the spectrum, where $H1<H2<H3$, and another mode where the first energy is a total energy of one or more peak areas of the spectrum, the second energy is a total energy of one or more peak areas of the spectrum, a portion of which includes the peak areas involved in the first energy, and the third energy is a total energy of one or more peak areas of the spectrum, a portion of which includes the peak areas involved in the second energy.

9. The audio classification system according to claim 8, wherein the statistics include at least one of the following items:

1) a mean of the residuals of the same level for the frames in the same segment;

2) variance: a standard deviation of the residuals of the same level for the frames in the same segment;

3) Residual_HighAverage: an average of the residuals of the same level for the frames in the same segment, which satisfy at least one of the following conditions:

a) greater than a first threshold; and b) within a predetermined proportion of residuals not lower than all the other residuals;

4) ResidualLowAverage: an average of the residuals of the same level for the frames in the same segment, which satisfy at least one of the following conditions:

c) smaller than a second threshold; and d) within a predetermined proportion of residuals not higher than all the other residuals; and 5) ResidualContrast: a ratio between Residual_HighAverage and ResidualLowAverage.

10. The audio classification system according to claim 1, wherein audio features for the audio classification include a spectrum-bin high energy ratio which is a ratio between the number of frequency bins with energy higher than a first threshold and the total number of frequency bins in the spectrum of each of the segments.

11. The audio classification system according to claim 10, wherein the first threshold is calculated as one of the following:

1) an average energy of the spectrum of the segment or a segment range around the segment;
2) a weighted average energy of the spectrum of the segment or a segment range around the segment, where the segment has a relatively higher weight, and each other segment in the range has a relatively lower weight, or where each frequency bin of relatively higher energy has a relatively higher weight, and each frequency bin of relatively lower energy has a relatively lower weight;
3) a scaled value of the average energy or the weighted average energy; and
4) the average energy or the weighted average energy plus or minus a standard deviation.

12. The audio classification system according to claim 1, wherein the classification device comprises:

a chain of at least two classifier stages with different priority levels, which are arranged in descending order of the priority levels; and a stage controller which determines a sub-chain starting from the classifier stage with the highest priority level, wherein the length of the sub-chain depends on the mode in the combination for the classification device, wherein each of the classifier stages comprises:

a classifier which generates current class estimation based on the corresponding audio features extracted from each of the segments, wherein the current class estimation includes an estimated audio type and corresponding confidence; and a decision unit which 1) if the classifier stage is located at the start of the sub-chain, determines whether the current confidence is higher than a confidence threshold associated with the classifier stage; and if it is determined that the current confidence is higher than the confidence threshold, terminates the audio classification by outputting the current class estimation, and if otherwise, provides the current class estimation to all the later classifier stages in the sub-chain, 2) if the classifier stage is located in the middle of the sub-chain, determines whether the current confidence is higher than the confidence threshold, or whether the current class estimation and all the earlier class estimation can decide an audio type according to a first decision criterion; and if it is determined that the current confidence is higher than the confidence threshold, or the class estimation can decide an audio type, terminates the audio classification by outputting the current class estimation, or outputting the decided audio type and the corresponding confidence, and if otherwise, provides the current class estimation to all the later classifier stages in the sub-chain, and 3) if the classifier stage is located at the end of the sub-chain, terminates the audio classification by outputting the current class estimation, or determines whether the current class estimation and all the earlier class estimation can decide an audio type according to a second decision criterion; and if it is determined that the class estimation can decide an audio type, terminates the audio classification by outputting the decided audio type and the corresponding confidence, and if otherwise, terminates the audio classification by outputting the current class estimation.

13. The audio classification system according to claim 12, wherein the first decision criterion comprises one of the following criteria:

1) if an average confidence of the current confidence and the earlier confidence corresponding to the same audio type as the current audio type is higher than a first threshold, the current audio type can be decided;
2) if a weighted average confidence of the current confidence and the earlier confidence corresponding to the same audio type as the current audio type is higher than an second threshold, the current audio type can be decided; and
3) if the number of the earlier classifier stages deciding the same audio type as the current audio type is higher than a ninth threshold, the current audio type can be decided, and wherein the output confidence is the current confidence or an weighted or unweighted average of the confidence of the class estimation which can decide the output audio type, where the earlier confidence has the higher weight than the later confidence.

14. The audio classification system according to claim 12, wherein the second decision criterion comprises one of the following criteria:

1) among all the class estimation, if the number of the class estimation including the same audio type is the highest, the same audio type can be decided by the corresponding class estimation;
2) among all the class estimation, if the weighted number of the class estimation including the same audio type is the highest, the same audio type can be decided by the corresponding class estimation; and
3) among all the class estimation, if the average confidence of the confidence corresponding to the same audio type is the highest, the same audio type can be decided by the corresponding class estimation, and wherein the output confidence is the current confidence or an weighted or un-weighted average of the confidence of the class estimation which can decide the output audio type, where the earlier confidence has the higher weight than the later confidence.

15. The audio classification system according to claim 12, wherein if a classification algorithm adopted by one of the classifier stages has higher accuracy in classifying at least one of the audio types, the classifier stages is specified with a higher priority level.

16. The audio classification system according to claim 12, wherein each training sample for the classifier in each of the latter classifier stages comprises at least an audio sample marked with the correct audio type, audio types to be identified by the classifier, and statistics on the confidence corresponding to each of the audio types, which is generated by all the earlier classifier stages based on the audio sample.

17. The audio classification system according to claim 12, wherein training samples for the classifier in each of the latter classifier stages comprises at least audio sample marked with the correct audio type but miss-classified or classified with low confidence by all the earlier classifier stages.

18. The audio classification system according to claim 12, wherein the at least one device comprises the feature extractor, the classification device and the post processor, and wherein the feature extractor is configured to:

for each of the segments, calculate residuals of frequency decomposition of at least level 1, level 2 and level 3 respectively by removing at least a first energy, a second energy and a third energy respectively from total energy E on a spectrum of each of frames in the segment;

and for each of the segments, calculate at least one item of statistics on the residuals of a same level for the frames in the segment, wherein the calculated residuals and statistics are included in the audio features, and wherein the at least two modes of the feature extractor include a mode where the first energy is a total energy of highest H1 frequency bins of the spectrum, the second energy is a total energy of highest H2 frequency bins of the spectrum, and the third energy is a total energy of highest H3 frequency bins of the spectrum, where H1<H2<H3, and another mode where the first energy is a total energy of one or more peak areas of the spectrum, the second energy is a total energy of one or more peak areas of the spectrum, a portion of which includes the peak areas involved in the first energy, and the third energy is a total energy of one or more peak areas of the spectrum, a portion of which includes the peak areas involved in the second energy, and wherein the post processor is configured to search for two repetitive sections in the audio signal, and smooth the classification result by regarding the segments between the two repetitive sections as non-speech type, and wherein at least two modes of the post processor include a mode where a relatively longer searching range is adopted, and another mode where a relatively shorter searching range is adopted.

19. The audio classification system according to claim 1, wherein class estimation is generated for each of the segments in the audio signal through the audio classification, where each of the class estimation includes an estimated audio type and corresponding confidence, and wherein the at least two modes of the post processor include a mode where the highest sum or average of the confidence corresponding to the same audio type in the window is determined, and the current audio type is replaced with the same audio type, and another mode where the window with a relatively shorter length is adopted, and/or the highest number of the confidence corresponding to the same audio type in the window is determined, and the current audio type is replaced with the same audio type.

20. The audio classification system according to claim 1, wherein the post processor is configured to search for two repetitive sections in the audio signal, and smooth the classification result by regarding the segments between the two repetitive sections as non-speech type, and wherein at least two modes of the post processor include a mode where a relatively longer searching range is adopted, and another mode where a relatively shorter searching range is adopted.

* * * * *